(12) United States Patent
Naveen et al.

(10) Patent No.: US 10,830,903 B2
(45) Date of Patent: Nov. 10, 2020

(54) LOW POWER MINIMAL RATE GLOBAL NAVIGATION SATELLITE SYSTEM SIGNAL TRACKING SYSTEM

(71) Applicant: Accord Ideation Private Limited, Bengaluru (IN)

(72) Inventors: Gowdayyanadoddi Shivaiah Naveen, Ramanagara (IN); Smruthi Marapacheru, Mangalore (IN); Chandrakala Ravindra, Bengaluru (IN); Srinivas Bhaskar, Bengaluru (IN)

(73) Assignee: ACCORD IDEATION PRIVATE LIMITED, Bengaluru (IN)

( * ) Notice: Subject to any disclaimer, the term of this patent is extended or adjusted under 35 U.S.C. 154(b) by 191 days.

(21) Appl. No.: 15/974,711

(22) Filed: May 9, 2018

(65) Prior Publication Data

US 2019/0277976 A1    Sep. 12, 2019

(51) Int. Cl.
G01S 19/34 (2010.01)
G01S 19/33 (2010.01)
G01S 19/29 (2010.01)
G01S 19/30 (2010.01)

(52) U.S. Cl.
CPC .............. *G01S 19/34* (2013.01); *G01S 19/29* (2013.01); *G01S 19/30* (2013.01); *G01S 19/33* (2013.01)

(58) Field of Classification Search
CPC ......... G01S 19/34; G01S 19/29; G01S 19/30; G01S 19/33; G01S 19/37; G01S 19/24; G01S 19/32
USPC .................................................. 342/357.68
See application file for complete search history.

(56) References Cited

U.S. PATENT DOCUMENTS

| | | | |
|---|---|---|---|
| 4,660,164 A | 4/1987 | Leibowitz | |
| 6,005,903 A | 12/1999 | Mendelovicz | |
| 7,197,064 B2 | 3/2007 | Loomis et al. | |
| 8,018,378 B2 | 9/2011 | Sun et al. | |
| 8,149,897 B2 | 4/2012 | Abraham | |
| 8,311,164 B2 | 11/2012 | Bu | |
| 8,401,546 B2 | 3/2013 | Landry et al. | |
| 2002/0012387 A1 | 1/2002 | Shaken et al. | |

(Continued)

FOREIGN PATENT DOCUMENTS

EP    0496354 A2    7/1992

*Primary Examiner* — Harry K Liu
(74) *Attorney, Agent, or Firm* — Rangarajan Sourirajan; Rajan Law Office, LLC

(57) ABSTRACT

A global navigation satellite system (GNSS) signal tracking system (GNSSSTS), deployed in a tracking channel of a GNSS baseband engine, includes a piecewise down sampling module for generating code bit accumulated values (CBAVs) at different time instants at a reduced rate from samples of intermediate frequency data received at a high rate, and a pseudo random noise (PRN) code generation module for generating a PRN code bit sequence (PRNCBS) corresponding to a GNSS signal and storing arms of the PRNCBS. The GNSSSTS includes a primary mixer for generating a despread value for a selected arm of the PRNCBS and a phase component generation module (PCGM) for generating inphase and quadrature phase correlation components of the despread value for storage in a storage array. The primary mixer, the PCGM, and the storage array perform their functions continuously for each CBAV generated at a corresponding time instant in a time multiplexed manner.

13 Claims, 12 Drawing Sheets

(56) References Cited

U.S. PATENT DOCUMENTS

| | | | |
|---|---|---|---|
| 2003/0081660 A1 | 5/2003 | King et al. | |
| 2007/0008195 A1* | 1/2007 | Jin | H03M 1/1255 |
| | | | 341/61 |
| 2009/0207076 A1* | 8/2009 | Schipper | G01S 19/24 |
| | | | 342/357.31 |
| 2010/0124242 A1* | 5/2010 | He | H04B 1/7077 |
| | | | 370/515 |
| 2011/0193745 A1 | 8/2011 | Ammann | |
| 2012/0281734 A1 | 11/2012 | Sun et al. | |
| 2012/0307810 A1* | 12/2012 | Sinsuan | H04W 28/06 |
| | | | 370/336 |
| 2013/0229305 A1 | 9/2013 | Nayyar et al. | |
| 2018/0188698 A1* | 7/2018 | Dionne | G04R 20/06 |

* cited by examiner

| CLOCK GENERATOR OUTPUT FREQUENCY TABLE | | | | | | | |
|---|---|---|---|---|---|---|---|
| 31 | 30 | 29 | 28 | --- | 26 | 1 | 0 |
| (Inc_wrd*fs/$2^{32}$) | (Inc_wrd*fs/$2^{31}$) | (Inc_wrd*fs/$2^{30}$) | (Inc_wrd*fs/$2^{29}$) | --- | (Inc_wrd*fs/$2^{27}$) | (Inc_wrd*fs/$2^{2}$) | (Inc_wrd*fs/$2^{1}$) |
| 1.023 MHz | 2.046 MHz | 4.092 MHz | 8.184 MHz | | 32.736 MHz | | |
| CODE CLOCK | | | SHIFT CLOCK | | | | |

FIG. 5

| FUNCTIONAL BLOCKS | STANDARD CORRELATOR (k=3) | | GNSSSTS (k=3) | | POWER SAVING RATIO |
|---|---|---|---|---|---|
| | COMPONENTS COUNT | RATE OF OPERATION OF A STANDARD CORRELATOR ($F_{SC}$) | COMPONENTS COUNT | RATE OF OPERATION OF THE GNSSSTS ($F_{GNSSSTS}$) | $F_{SC}/F_{GNSSSTS}$ |
| REAL/IMAGINARY COMPONENTS MIXING | 4 | fs | 4 | (fc*k) | fs/(fc*k) |
| SMALL ADDERS/SUBTRACTORS | 1 | fs | 1 | (fc*k) | fs/(fc*k) |
| CARRIER GENERATOR (32-BIT NCO AND PHASE-TO-AMPLITUDE CONVERTOR) | 1 | fs | 1 | (fs/M) | M |
| PRN CODE GENERATOR (32-BIT NCO) | 1 | fs | 1 | fs | 1 |
| PRN CODE GENERATOR (LFSR BASED CODE GENERATOR WITH TWO POLYNOMIALS) | 1 | Chipping Rate | 1 | Chipping Rate | 1 |
| PIECEWISE ACCUMULATOR | - | - | 3 | fs | - |
| CODE BIT ACCUMULATOR | - | - | 1 | fs | - |

FIG. 10A

| FUNCTIONAL BLOCKS | STANDARD CORRELATOR (k=3) | | GNSSSTS (k=3) | | POWER SAVING RATIO $F_{SC}/F_{GNSSSTS}$ |
|---|---|---|---|---|---|
| | COMPONENTS COUNT | RATE OF OPERATION OF STANDARD CORRELATOR ($F_{SC}$) | COMPONENTS COUNT | RATE OF OPERATION OF THE GNSSSTS ($F_{GNSSSTS}$) | |
| PRIMARY MIXER | 3 | fs | 2 | (fc*k) | fs/(fc*k) |
| INTEGRATOR AND DUMP UNIT (I AND Q COHERENT INTEGRATION) | 6 | fs | 2 | (fc*k) | fs/(fc*k) |
| STORAGE ARRAY | 6 | fs | 6 | (fc*k) | fs/(fc*k) |

FIG. 10B

LOW POWER MINIMAL RATE GLOBAL NAVIGATION SATELLITE SYSTEM SIGNAL TRACKING SYSTEM

CROSS-REFERENCE TO RELATED APPLICATIONS

This application claims priority to and the benefit of the non-provisional patent application titled "Low Power Minimal Rate Global Navigation Satellite System Signal Tracking System", application number 201841008370, filed in the Indian Patent Office on Mar. 7, 2018. The specification of the above referenced patent application is incorporated herein by reference in its entirety.

BACKGROUND

Global navigation satellite system (GNSS) constellations include, for example, the global positioning system (GPS) constellation, the Globalnaya Navigatsionnaya Sputnikovaya Sistema (GLONASS) constellation, the Galileo constellation, the BeiDou navigation satellite system constellation, the Indian regional navigation satellite system (IRNSS) constellation, the Quasi-Zenith satellite system (QZSS) constellation, and constellations of satellite based augmentation systems (SBAS) in well-defined geostationary orbits. Each satellite in the GNSS constellations continually broadcasts GNSS signals that contain accurate system time and orbital position of the corresponding satellite. In general, the GNSS constellations use a channel access method, for example, a code division multiple access (CDMA) technique or a frequency division multiple access (FDMA) technique for broadcasting the GNSS signals. In the CDMA technique, multiple GNSS signals are simultaneously transmitted over a single communication channel using a single carrier frequency, for example, by multiplexing multiple GNSS signals onto the same frequency and by modulating the single carrier frequency with different pseudo random noise (PRN) codes. In the FDMA technique used, for example, by the GLONASS constellation, each satellite is assigned a different carrier frequency but all the carrier frequencies are modulated using a common PRN code to spread power.

With increasing global navigation satellite system (GNSS) constellations in the sky, there is an increased need for GNSS receivers that are capable of receiving and processing signals from all the GNSS constellations. For example, the GNSS receivers should be able to receive signals from the satellites of the GNSS constellations to provide accurate and reliable geographical position, velocity and time. A GNSS receiver, upon receiving a GNSS signal, performs signal acquisition and tracking operations. The GNSS receiver searches for a signal corresponding to a satellite, in the GNSS signal. The GNSS receiver locks onto the signal corresponding to the satellite and subsequently tracks the corresponding satellite to receive satellite information. The signal acquisition and tracking operations facilitate computation of an accurate and reliable position, velocity and time. While conventional GNSS receivers are configured to receive the GNSS signals from different GNSS constellations to provide accurate and reliable position, velocity, and time, the tradeoff is the increased size of the GNSS receivers and the power consumption. A typical GNSS receiver spends a substantial amount of time in a tracking operation as the GNSS receiver must continuously track the GNSS signals from the satellites of the GNSS constellations. Tracking channels of the GNSS receiver operate at a sampling frequency during the tracking operation. To support processing of the GNSS signals from different GNSS constellations, an increase in the signal bandwidth is required, which in turn increases the sampling frequency. The increase in the sampling frequency of the GNSS receiver in turn significantly increases power consumption at a baseband processor level and significantly increases runtime average power consumption of the GNSS receiver.

A conventional method for reducing size and power consumption of the global navigation satellite system (GNSS) receiver is by employing an application specific integrated circuit (ASIC) for processing the GNSS signals. However, even with the ASIC, there is a need for further reduction in size and power consumption as there are many commercial applications that are battery operated and require a substantially small footprint. The size and power consumption of the ASIC are driven by the architecture of the GNSS receiver. Hence, there is a need for an architecture that reduces the size and the power consumption of the GNSS receiver to further reduce the cost of the ASIC. During a typical GNSS receiver operation, substantial power consumption is by the tracking channels of the GNSS receiver. Hence, there is a need for a method and a system that reduce the average power consumption of the tracking channels in the GNSS receiver during the tracking operation without affecting signal quality.

An implementation of resampling before code mixing is a technique employed in conventional acquisition correlators to save area and power since acquisition does not require a high resolution code delay search. In resampling, carrier mixed values are integrated over one code bit period that provides a code resolution of 1 bit, and mixed with a single code bit. Therefore, resampling provides a code resolution of 1 bit and code mixing is performed at a code frequency that is a lower frequency compared to the sampling frequency. A code mixer and subsequent accumulators that follow the code mixer operate at the lower frequency, thereby reducing power consumption of the global navigation satellite system (GNSS) receiver. The tracking channels of the GNSS receiver require a high resolution code delay search due to which the output of a carrier mixer in a conventional resampling architecture cannot be integrated over a code bit period as performed in the acquisition operation. While resampling can be performed by integrating the GNSS signal over a fraction of the code bit period, the power reduction benefit is not significant in the tracking operation. In a tracking channel with a conventional resampling architecture, code bits such as early, prompt and late code bits correspond to different code chip shifts and require three correlators, which increase logic area and increase power consumption of the GNSS receiver. There is a need for a system that implements resampling in the tracking channels, where carrier mixed values are integrated in the tracking operation of the GNSS receiver to reduce average power consumption of the GNSS receiver during the tracking operation without affecting the signal quality.

Hence, there is a long felt but unresolved need for a global navigation satellite system signal tracking system (GNSSTS) deployed in a tracking channel of a global navigation satellite system (GNSS) baseband engine of a GNSS receiver for tracking a GNSS signal with reduced power consumption and a reduced size of the GNSS receiver, which in turn reduces the cost of the application specific integrated circuit (ASIC) chipset of the GNSS receiver.

SUMMARY OF THE INVENTION

This summary is provided to introduce a selection of concepts in a simplified form that are further disclosed in the detailed description of the invention. This summary is not intended to determine the scope of the claimed subject matter.

The global navigation satellite system (GNSS) receiver disclosed herein addresses the above recited need for a global navigation satellite system signal tracking system (GNSSSTS) deployed in a tracking channel of a GNSS baseband engine of a GNSS receiver for tracking a GNSS signal with reduced power consumption and a reduced size of the GNSS receiver, which in turn reduces the cost of an application specific integrated circuit (ASIC) chipset of the GNSS receiver. The GNSSSTS disclosed herein reduces average power consumption of the GNSS receiver during a tracking operation without affecting signal quality. The GNSSSTS disclosed herein generates inphase correlation components and quadrature phase correlation components at a reduced rate compared to a rate of receiving an input stream of samples of intermediate frequency data.

The global navigation satellite system signal tracking system (GNSSSTS) disclosed herein comprises an accumulation control logic unit, a piecewise down sampling module, a pseudo random noise (PRN) code generation module, a first selector, a time multiplexed primary mixer, a time multiplexed phase component generation module, a second selector, and a storage array. The accumulation control logic unit generates control signals. The piecewise down sampling module is operably connected to the accumulation control logic unit. The piecewise down sampling module generates code bit accumulated values at different time instants at a reduced rate from a stream of samples of intermediate frequency data received at a rate higher than the reduced rate of the code bit accumulated values, on receiving at least two of the control signals from the accumulation control logic unit. The PRN code generation module is operably connected to the piecewise down sampling module via the time multiplexed primary mixer. The PRN code generation module generates a PRN code bit sequence corresponding to the global navigation satellite system (GNSS) signal and stores multiple arms of the generated PRN code bit sequence.

The first selector is operably connected to the pseudo random noise (PRN) code generation module. The first selector selects one of the stored arms of the generated PRN code bit sequence for one of the code bit accumulated values generated at one of the time instants, on receiving another control signal from the accumulation control logic unit. The time multiplexed primary mixer is operably connected to the first selector and the piecewise down sampling module. The time multiplexed primary mixer generates a despread value by mixing the code bit accumulated value with the selected arm of the generated PRN code bit sequence. The time multiplexed phase component generation module is operably connected to the time multiplexed primary mixer. The time multiplexed phase component generation module generates an inphase correlation component and a quadrature phase correlation component of the generated despread value. The storage array is operably connected to the time multiplexed phase component generation module via the second selector. The storage array stores the generated inphase correlation component and the generated quadrature phase correlation component of the generated despread value in a storage location of the storage array selected by the second selector based on the selected arm of the generated PRN code bit sequence. The first selector, the time multiplexed primary mixer, the time multiplexed phase component generation module, and the storage array perform their respective functions continuously for each of the code bit accumulated values generated at corresponding time instants in a time multiplexed manner.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

FIG. 5 exemplarily illustrates a table showing output frequency of a clock generator of the global navigation satellite system signal tracking system.

FIGS. 10A-10B exemplarily illustrate a comparison table showing resource comparison and reduction of power consumption between a standard correlator and the global navigation satellite system signal tracking system.

DETAILED DESCRIPTION OF THE INVENTION

Figure 1:
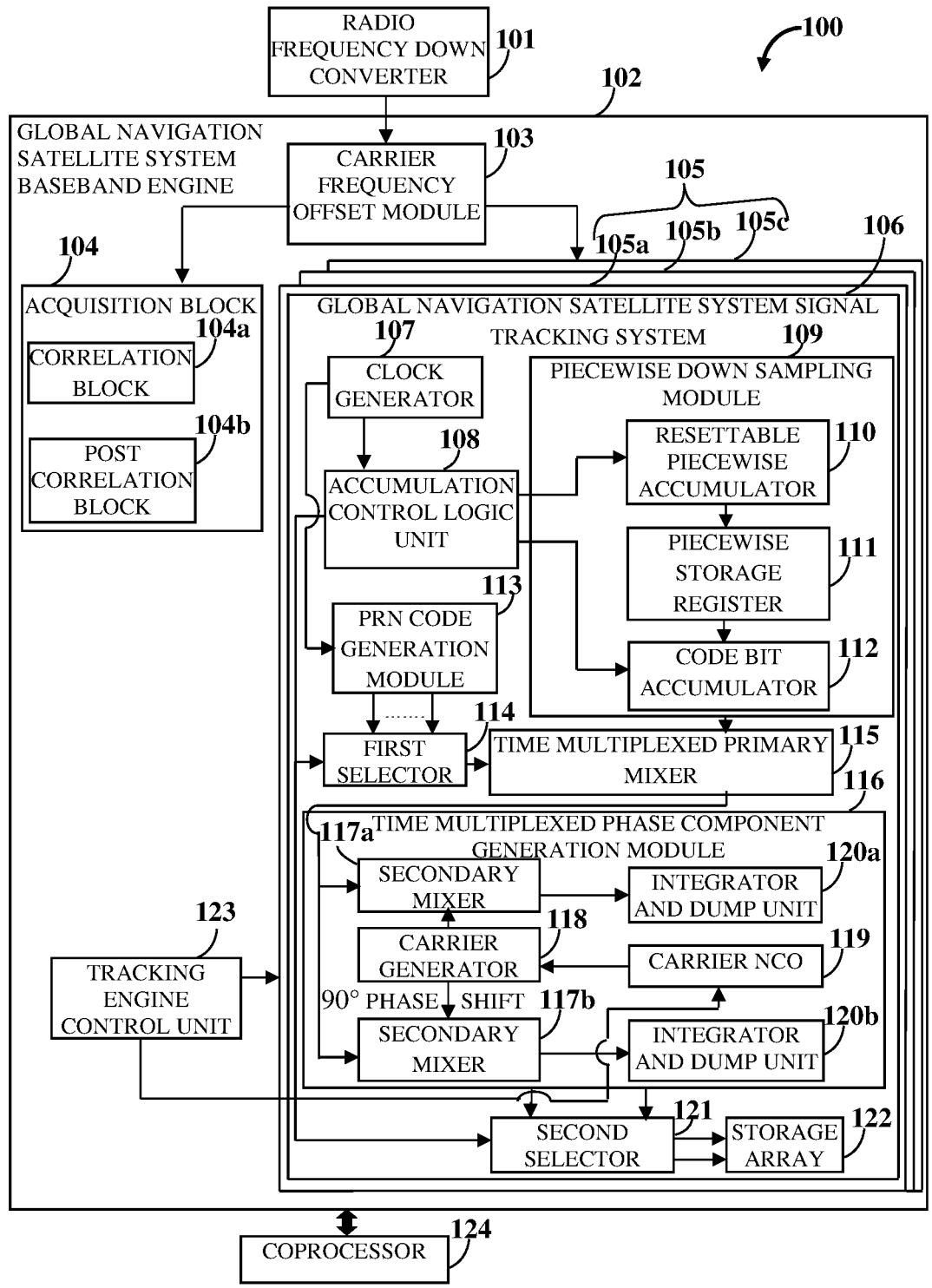
FIG. 1 exemplarily illustrates a global navigation satellite system receiver comprising a global navigation satellite system signal tracking system deployed in a tracking channel of a global navigation satellite system baseband engine.

FIG. 1 exemplarily illustrates a global navigation satellite system (GNSS) receiver 100 comprising a global navigation satellite system signal tracking system (GNSSSTS) 106 deployed in a tracking channel 105a of a tracking channel array 105 of a GNSS baseband engine 102. The GNSS receiver 100 is used for acquiring and tracking multiple GNSS signals comprising global positioning system (GPS) signals. As used herein, a "global navigation satellite system signal" refers to a navigation signal transmitted by a satellite in a GNSS constellation. For example, a GPS satellite transmits GPS signals in one of L1, L2, and L5 frequency bands. The GNSS receiver 100 is programmable for acquiring a particular GNSS signal out of multiple GNSS signals used for global navigation. The GNSS receiver 100 receives a GNSS signal and acquires the received GNSS signal, if the received GNSS signal is the same as the GNSS signal programmed for acquisition. The GNSS signal received by the GNSS receiver 100 comprises a complex signal and/or a real signal having a frequency in a range of, for example, about 1151 megahertz (MHz) to about 2492 MHz. The GNSS signal further comprises multiple ranging codes, for example, pseudo random noise codes, and navigation data comprising, for example, 50 bits per second navigation data in a GPS L1 coarse/acquisition (C/A) signal. As used herein, a "pseudo random noise (PRN) code" refers to a unique binary code sequence of binary digits, that is, +1s and −1s that enables the GNSS receiver 100 to identify the satellite that transmits the GNSS signal. The sequence of binary digits of the PRN code closely approximates a random binary sequence. The PRN codes are sequences of pulses that are used by a global navigation satellite system (GNSS) to spread a spectrum of the GNSS signal for transmission and despread the spectrum of the received GNSS signal. Despreading recombines the GNSS signal that was spread. The PRN codes are not truly random but have a finite length and are known to both a GNSS satellite and the GNSS receiver 100. A PRN code generator is a component that generates the PRN codes.

The global navigation satellite system (GNSS) receiver 100 disclosed herein comprises a radio frequency (RF) down converter 101, the GNSS baseband engine 102, and a coprocessor 124 as exemplarily illustrated in FIG. 1. In an embodiment, the RF down converter 101, the GNSS baseband engine 102, and the coprocessor 124 are implemented in a single chip. In another embodiment, the RF down converter 101, the GNSS baseband engine 102, and the coprocessor 124 are implemented independently on separate chips. In another embodiment, any combination of the RF down converter 101, the GNSS baseband engine 102, and the coprocessor 124 is implemented as an application specific integrated circuit (ASIC) or a field programmable gate array (FPGA). The RF down converter 101 is an integrated circuit that down converts the received GNSS signal to an intermediate frequency (IF) signal. As used herein, "intermediate frequency signal" refers to a down converted GNSS signal. In an embodiment, the RF down converter 101 comprises a down convertor and an analog-to-digital converter (ADC) (not shown). The ADC samples the IF signal at a sampling rate or a sampling frequency, that is, fs megahertz (MHz), for generating a stream of samples of IF data. In an example, if the GNSS receiver 100 receives a GNSS signal having a frequency of 1575.42 MHz, the RF down converter 101 down converts the received GNSS signal with the frequency of 1575.42 MHz to an IF signal with a frequency of $f_{IF}$ MHz. The ADC samples the IF signal with the frequency of $f_{IF}$ MHz at a rate of fs MHz to generate N samples of IF data, where in an example, $f_{IF}$=4.092 MHz and fs=16.368 MHz, and in another example $f_{IF}$=10.22 MHz and fs=45.15 MHz.

The global navigation satellite system (GNSS) baseband engine 102 of the GNSS receiver 100 is implemented as an application specific integrated circuit (ASIC) or a field programmable gate array (FPGA) for processing the GNSS signal received by the GNSS receiver 100. The GNSS baseband engine 102 receives the N samples of the intermediate frequency (IF) data from the radio frequency (RF) down converter 101. The GNSS baseband engine 102 comprises an acquisition block 104 and a tracking channel array 105 for acquiring and tracking the GNSS signal used for global navigation respectively. In an embodiment where the stream of samples of the IF data are at non-zero IF, the GNSS baseband engine 102 further comprises a carrier frequency offset module 103 operably connected to the RF down converter 101. The carrier frequency offset module 103 is operably connected between the RF down converter 101, the acquisition block 104, and the tracking channel array 105 as exemplarily illustrated in FIG. 1. The carrier frequency offset module 103 receives the stream of samples of the IF data transmitted by the RF down converter 101, and if the carrier frequency of the stream of samples of the IF data is not at a zero value or a near zero value, the carrier frequency offset module 103 offsets the carrier frequency of the stream of samples of the IF data to zero or near zero by mixing the stream of samples of the IF data with a locally generated offsetting carrier reference signal with frequency equal to the IF, before passing the stream of samples of the IF data to the acquisition block 104 and the tracking channel array 105. As used herein, "offsetting carrier reference signal" refers to a locally generated signal whose frequency is negative of the frequency of the stream of samples of the IF data, used for offsetting the carrier frequency of the stream of samples of the IF data received from the RF down converter 101 of the GNSS receiver 100. The offsetting carrier reference signal can therefore be a positive IF signal or a negative IF signal that complements the incoming stream of samples of the IF data.

The acquisition block 104 of the global navigation satellite system (GNSS) baseband engine 102 acquires the GNSS signal, if the received GNSS signal is the same as the satellite signal programmed for acquisition. The acquisition block 104 comprises a correlation block 104a and a post correlation block 104b. The correlation block 104a receives the stream of samples of the zero or near zero intermediate frequency (IF) data transmitted by the carrier frequency offset module 103, where the samples of the zero or near zero IF data refer to the samples of the IF data with zero or near zero carrier frequency. The correlation block 104a then correlates the received samples of the zero or near zero IF data with locally generated reference carrier signals and reference pseudo random noise (PRN) code bit sequences to generate correlation components of the samples of the zero or near zero IF data corresponding to the received GNSS signal. The correlation components refer to values that indicate correlation between the samples of the IF data with a locally generated PRN code and a locally generated carrier signal. The post correlation block 104b receives the correlation components generated by the correlation block 104a. The post correlation block 104b coherently and non-coherently integrates the received correlation components to generate correlation values and increase signal-to-noise ratio. If the generated correlation values are greater than a predetermined threshold value, then the GNSS receiver 100 declares that the GNSS signal that is being searched is present in the incoming GNSS signal; else the GNSS receiver 100 declares that the GNSS signal that is being searched is not present in the incoming GNSS signal. The correlation block 104a searches for GNSS signals transmitted by satellites and determines which satellites are visible to an antenna of the GNSS receiver 100.

The tracking channel array 105 of the global navigation satellite system (GNSS) baseband engine 102 is used for tracking a GNSS signal. The tracking channel array 105 performs tracking of either a positive frequency GNSS signal or a negative frequency GNSS signal. The GNSS signal can be either the GNSS signal acquired by the acquisition block 104, or a GNSS signal specifically programmed for tracking. In the GNSS receiver 100 disclosed herein, a global navigation satellite system signal tracking system (GNSSSTS) 106 is deployed in each of the tracking channels 105a, 105b, and 105c of the tracking channel array 105 for tracking the GNSS signal. The GNSSSTS 106 in each of the tracking channels 105a, 105b, and 105c of the tracking channel array 105 comprises a clock generator 107, an accumulation control logic unit 108, a piecewise down sampling module 109, a pseudo random noise (PRN) code generation module 113, a first selector 114, a time multiplexed primary mixer 115, a time multiplexed phase component generation module 116, a second selector 121, and a storage array 122. The clock generator 107 is a code numerically controlled oscillator (NCO) that generates clock signals with a programmed code Doppler frequency for activating the PRN code generation module 113 to generate PRN codes. An NCO is a digital signal generator that generates a clocked, discrete time, and discrete valued signal. The received samples of the zero or near zero IF data contain oscillator drifts of the GNSS receiver 100 along with a frequency deviation due to a relative motion between the GNSS receiver 100 and satellites of a GNSS constellation. The frequency of N samples of zero or near zero IF data comprising the frequency deviation due to motion of a corresponding satellite, a user's motion, and the oscillator drifts is referred to as Doppler frequency. The clock generator 107 also activates the accumulation control logic unit 108 as disclosed in the detailed description of FIG. 3.

Figure 6:
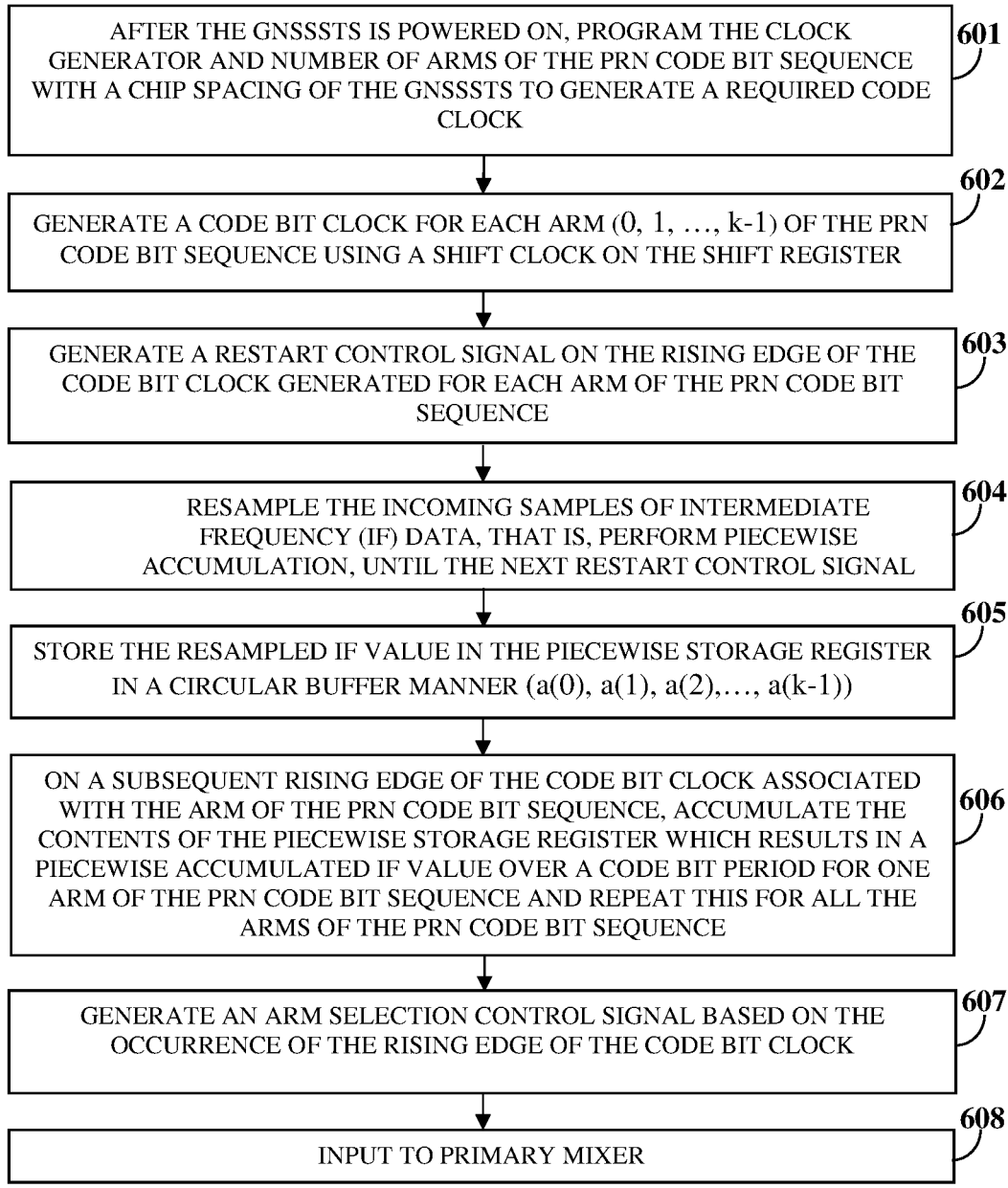
FIG. 6 exemplarily illustrates a method for generating control signals and controlling operations of the global navigation satellite system signal tracking system.
Figure 7:
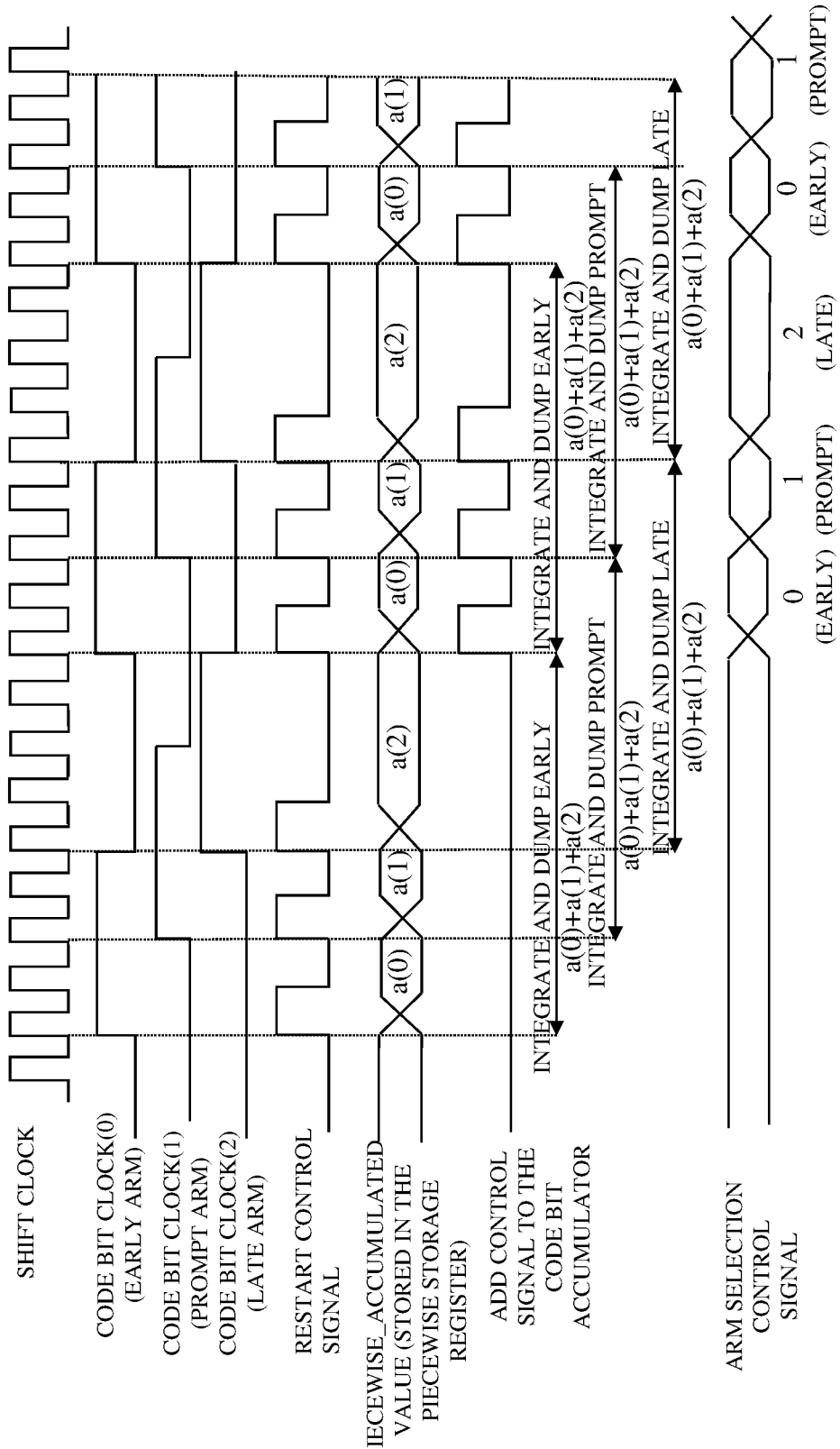
FIG. 7 exemplarily illustrates a timing diagram showing generation of the control signals and control of the operations of the global navigation satellite system signal tracking system.

The accumulation control logic unit 108 generates control signals that control the operation of the piecewise down sampling module 109, the first selector 114, and the second selector 121 as disclosed in the detailed descriptions of FIGS. 6-7. On receiving at least two of the control signals from the accumulation control logic unit 108, the piecewise down sampling module 109 generates code bit accumulated values at different time instants at a reduced rate, fc*k, from the stream of samples of intermediate frequency (IF) data received at a rate, fs, that is higher than the reduced rate of the code bit accumulated values, where fc is a notation for chipping rate and k is the number of arms of a pseudo random noise (PRN) code bit sequence. As used herein, "chipping rate" refers to a rate at which each chip is modulated on a carrier signal. Also, as used herein, "chip" refers to a pulse of the PRN code bit sequence. Also, as used herein, "arms" refers to time varied replicas of the PRN code bit sequence. For example, early, prompt, and late are the arms of a PRN code bit sequence, where early is a time advanced replica of the PRN code bit sequence, prompt is a time aligned replica of the PRN code bit sequence, and late is a time delayed replica of the PRN code bit sequence. The arms define the PRN code bit sequence that corresponds to different PRN code chip shifts.

The piecewise down sampling module 109 of the global navigation satellite system signal tracking system (GNSSSTS) 106 disclosed herein comprises a resettable piecewise accumulator 110, a piecewise storage register 111, and a code bit accumulator 112. The resettable piecewise accumulator 110 is an accumulator that receives the stream of samples of the zero or near zero intermediate frequency (IF) data and accumulates the samples of the zero or near zero IF data in a piecewise manner on receiving a control signal generated by the accumulation control logic unit 108. An accumulator is a component that receives the samples of the IF data and adds the received samples of the IF data to generate a cumulative output. The resettable piecewise accumulator 110 is reset on receiving another control signal generated by the accumulation control logic unit 108 as disclosed in the detailed descriptions of FIGS. 6-7. The resettable piecewise accumulator 110 continuously generates piecewise accumulated IF values from the samples of the zero or near zero IF data at different time instants as disclosed in the detailed description of FIG. 4. The piecewise storage register 111 is a data storage element that stores the piecewise accumulated IF values generated at different time instants in storage locations 111a, 111b, and 111c exemplarily illustrated in FIGS. 2-4, that correspond to the different time instants as disclosed in the detailed descriptions of FIGS. 3-7. The code bit accumulator 112 is an accumulator that receives the stored piecewise accumulated IF values and generates code bit accumulated values at different time instants at a reduced rate, fc*k, continuously as disclosed in the detailed descriptions of FIGS. 3-7.

The pseudo random noise (PRN) code generation module 113 of the global navigation satellite system signal tracking system (GNSSSTS) 106 disclosed herein generates a PRN code bit sequence corresponding to the received global navigation satellite system (GNSS) signal and stores the arms of the generated PRN code bit sequence. The first selector 114 selects one of the stored arms of the generated PRN code bit sequence for one of the code bit accumulated values generated at one of the time instants, on receiving a control signal from the accumulation control logic unit 108. The time multiplexed primary mixer 115 is a component that combines two or more signals to generate a composite signal. The time multiplexed primary mixer 115 mixes the code bit accumulated value generated at a time instant with the selected arm of the PRN code bit sequence to generate a despread value as disclosed in the detailed descriptions of FIGS. 6-7.

The time multiplexed phase component generation module 116 of the global navigation satellite system signal tracking system (GNSSSTS) 106 generates an inphase correlation component and a quadrature phase correlation component of the generated despread value corresponding to the selected arm of the pseudo random noise (PRN) code bit sequence. As used herein, "inphase correlation component" refers to an integrated correlation component that is offset in phase by a zero cycle, that is, zero radians, in relation to the global navigation satellite system (GNSS) signal. Also, as used herein, "quadrature phase correlation component" refers to an integrated correlation component that is offset in phase by a one-quarter cycle, that is, π/2 radians in relation to the GNSS signal. Quadrature phase correlation components of the GNSS signal are components that are 90° out of phase with the GNSS signal.

The time multiplexed phase component generation module 116 comprises a carrier numerically controlled oscillator (NCO) 119, a carrier generator 118, secondary mixers 117a and 117b, and integrator and dump units 120a and 120b. The carrier NCO 119 is a digital signal generator that generates a local copy of a carrier reference signal with a carrier Doppler frequency offset at a reduced rate fs/M, where the carrier Doppler frequency offset is programmable and "M" is a rate reduction factor that reduces the rate at which the carrier reference signal is generated, for example, to about 1 MHz or to about as low as twice the Doppler frequency required to be generated by each of the tracking channels 105a, 105b, and 105c of the tracking channel array 105. The global navigation satellite system (GNSS) baseband engine 102 further comprises a tracking engine control unit 123 operably connected to the tracking channel array 105. The tracking engine control unit 123 is further operably connected to the global navigation satellite system signal tracking system (GNSSSTS) 106 in each of the tracking channels 105a, 105b, and 105c of the tracking channel array 105.

In an embodiment, the tracking engine control unit 123 stores a programming parameter used to program the carrier numerically controlled oscillator (NCO) 119 and in turn the carrier generator 118 in each of the tracking channels 105a, 105b, and 105c of the tracking channel array 105. In an example, the tracking engine control unit 123 provides the programming parameter to the tracking channel 105a at a specific time instant. The rate reduction factor "M" is used to reduce the rate at which the carrier reference signal is to be generated by the carrier NCO 119, for example, to about 1 MHz, or to about as low as twice the Doppler frequency offset, or up to a maximum of the fc*k value. The tracking engine control unit 123 generates a control signal for controlling and selecting the reduced rate fs/M at which the carrier reference signal is to be generated by the carrier NCO 119 of the time multiplexed phase component generation module 116. The tracking engine control unit 123 is commonly used by the global navigation satellite system signal tracking systems (GNSSSTSs) 106 deployed in all the tracking channels 105a, 105b, and 105c of the tracking channel array 105. The tracking engine control unit 123 provides the control signal for controlling and selecting the reduced rate fs/M at which the carrier reference signal is to be generated by the carrier NCOs 119 in all the tracking channels 105a, 105b, and 105c of the tracking channel array 105. In an embodiment, the tracking engine control unit 123 comprises a single NCO (not shown) that is commonly used by all the tracking channels 105a, 105b, and 105c of the tracking channel array 105. This single NCO in the tracking engine control unit 123 generates a reduced sampling frequency clock, for example, of about 1 MHz or about as low as twice the Doppler frequency that needs to be generated by a tracking channel, for example, 105a, in a low power mode, to operate the carrier NCO 119 and in turn the carrier generator 118. This allows the carrier NCO 119 and the carrier generator 118 to operate with less power when compared to operating the carrier NCO 119 and the carrier generator 118 at the sampling frequency fs.

The carrier generator 118 of the time multiplexed phase component generation module 116 generates an inphase carrier signal and a quadrature phase carrier signal using the carrier reference signal generated at the reduced rate fs/M by the carrier numerically controlled oscillator (NCO) 119. The carrier generator 118 shifts the phase of the inphase carrier signal by 90 degrees to generate the quadrature phase carrier signal. The secondary mixers 117a and 117b generate an inphase component and a quadrature phase component of the generated despread value respectively, by mixing the generated despread value corresponding to the selected arm of the pseudo random noise (PRN) code bit sequence with the generated inphase carrier signal and the generated quadrature phase carrier signal respectively. The inphase and quadrature carrier signals move over time and facilitate generation of inphase and quadrature phase components by the secondary mixers 117a and 117b respectively. The integrator and dump units 120a and 120b generate an inphase correlation component and a quadrature phase correlation component of the generated despread value respectively, by coherently integrating and dumping the generated inphase component and the quadrature phase component respectively, of the generated despread value that corresponds to the selected arm of the PRN code bit sequence with a previously generated inphase component and a previously generated quadrature phase component of a previously generated despread value respectively, corresponding to the selected same stored arm of the PRN code bit sequence.

Figure 2:
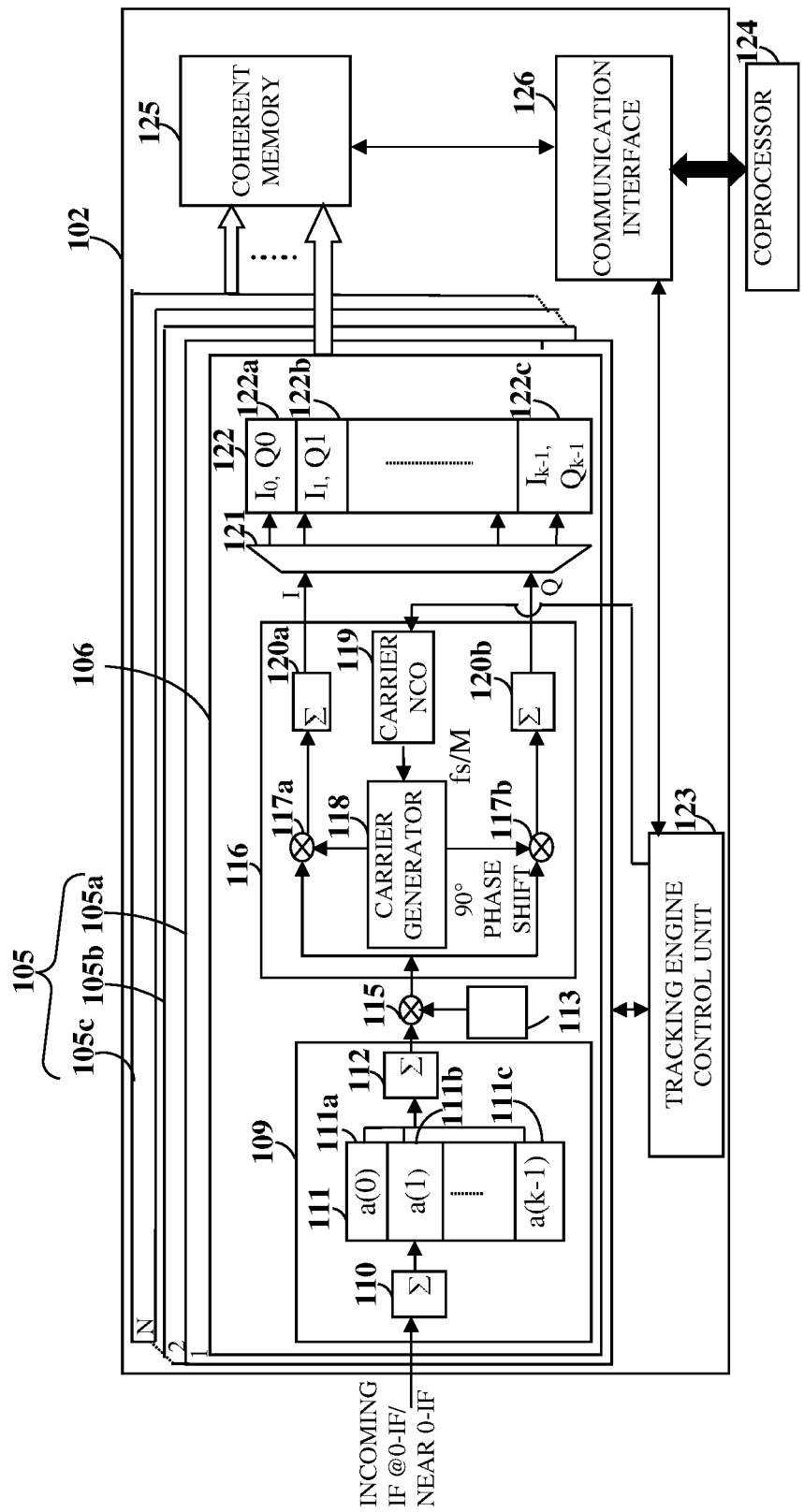
FIG. 2 exemplarily illustrates components of the global navigation satellite system signal tracking system deployed in a tracking channel of a tracking channel array of the global navigation satellite system baseband engine.
Figure 3:
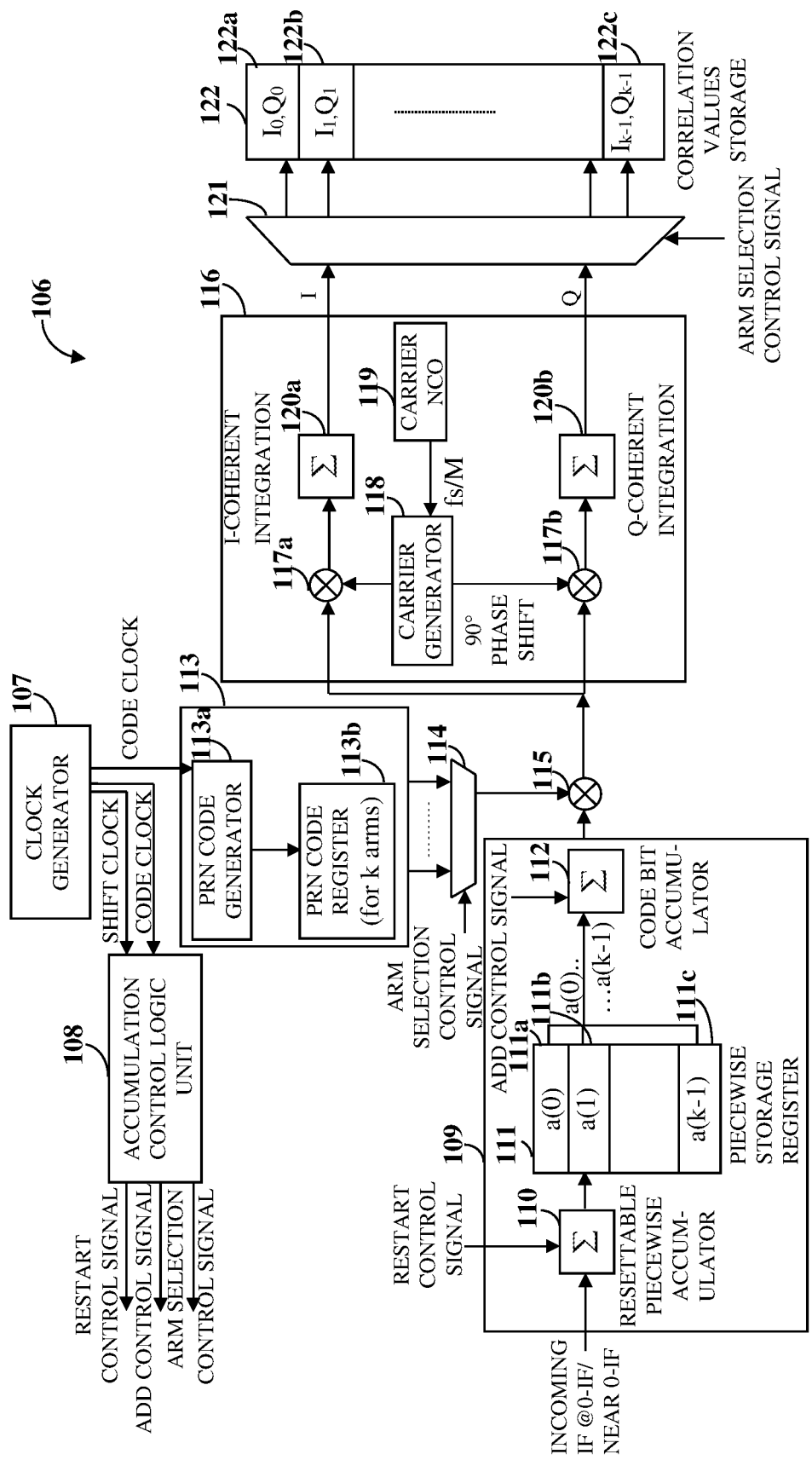
FIG. 3 exemplarily illustrates the global navigation satellite system signal tracking system deployed in a single tracking channel of the global navigation satellite system baseband engine.
Figure 4:
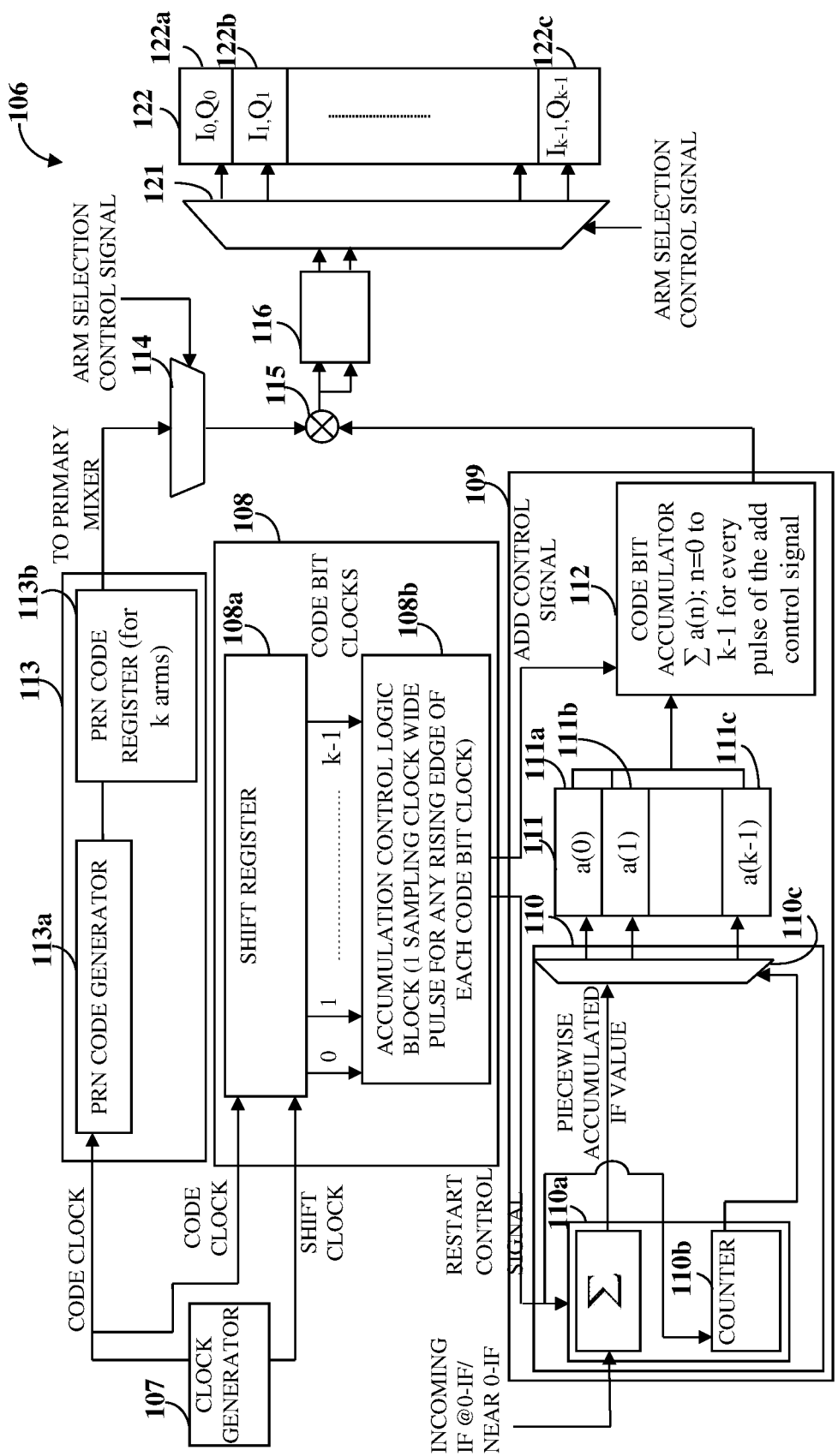
FIG. 4 exemplarily illustrates code bit clock generation and code bit accumulation performed in the global navigation satellite system signal tracking system.

The storage array 122 of the global navigation satellite system signal tracking system (GNSSSTS) 106 is an array of data storage elements defining storage locations 122a, 122b, and 122c exemplarily illustrated in FIGS. 2-4, for storing the generated inphase correlation component and the generated quadrature phase correlation component of the generated despread value. The storage array 122 stores the generated inphase correlation component and the generated quadrature phase correlation component of the generated despread value in a storage location 122a, 122b, or 122c selected by the second selector 121 based on the selected arms of the generated pseudo random noise (PRN) code bit sequence. The first selector 114, the time multiplexed primary mixer 115, the time multiplexed phase component generation module 116, and the storage array 122 perform their respective functions continuously for each of the code bit accumulated values generated by the piecewise down sampling module 109 at corresponding time instants.

The functions performed by the first selector 114, the time multiplexed primary mixer 115, the time multiplexed phase component generation module 116, and the storage array 122 repeat continuously in a time multiplexed manner during the subsequent time instants of generation of the code bit accumulated values by the code bit accumulator 112 of the piecewise down sampling module 109 at the reduced rate fc*k. The primary mixer 115 and the phase component generation module 116 are time multiplexed for generating the despread value and the inphase and quadrature phase correlation components respectively, at all the time instants of generation of the code bit accumulated values. The inphase correlation components and the quadrature phase correlation components generated at all the time instants are stored in the storage array 122.

The coprocessor 124 of the global navigation satellite system (GNSS) receiver 100 programs parameters comprising, for example, the carrier intermediate frequency (IF), the carrier frequency offset, the carrier Doppler frequency, the code Doppler frequency, the pseudo random noise (PRN) code bit sequence and its code phase, arms of the PRN code bit sequence, a code bit period, and an integration period. As used herein, "code bit period" refers to a time period of a pulse of a PRN code bit sequence. Also, as used herein, "integration period" refers to a duration of coherent accumulation of the samples of the intermediate frequency (IF) data after mixing the samples of the IF data with the PRN code bit sequence to generate the despread value using the time multiplexed primary mixer 115 and after mixing the despread value with the carrier signal using the secondary mixers 117a and 117b. The coprocessor 124 uses the global navigation satellite system signal tracking system (GNSSSTS) 106 to continuously track the GNSS signal.

The global navigation satellite system (GNSS) receiver 100 comprising the global navigation satellite system signal tracking system (GNSSSTS) 106 disclosed herein provides an improvement in satellite signal receiver technology as follows: On implementing the GNSS receiver 100 disclosed herein using the GNSS baseband engine 102 employing the GNSSSTS 106, the resettable piecewise accumulator 110 receives and accumulates the stream of samples of intermediate frequency (IF) data at the frequency fs. The generated piecewise accumulated samples of the IF data are stored in the piecewise storage register 111 at the frequency fs. The code bit accumulator 112 accumulates the stored piecewise accumulated samples of the IF data at the frequency fs and generates code bit accumulated values at a reduced rate fc*k. The pseudo random noise (PRN) code generation module 113 generates the PRN code bit sequence and stores the arms of the PRN code bit sequence at the frequency fs.

Furthermore, the time multiplexed phase component generation module 116 comprising the secondary mixers 117a and 117b and the integrator and dump units 120a and 120b operate at the reduced rate fc*k based on the control signal provided by the tracking engine control unit 123 for controlling and selecting the reduced rate fs/M of the carrier reference signal. The code bit accumulated values generated at the rate of fc*k by the code bit accumulator 112 and the carrier signal generated at the rate of fs/M by the carrier generator 118 are provided as inputs to the secondary mixers 117a and 117b. Therefore, the secondary mixers 117a and 117b generate the inphase component and the quadrature phase component of the despread value respectively, at the rate of fc*k and the integrator and dump units 120a and 120b generate the inphase correlation component and the quadrature phase correlation component of the despread value respectively, at the rate of fc*k. The components that operate at the reduced rate fs/M and fc*k consume less power compared to the components that operate at the frequency fs. The global navigation satellite system signal tracking system (GNSSSTS) 106 reduces average power consumption of the tracking channel array 105 in the GNSS receiver 100 during the tracking operation and during runtime without affecting the signal quality. The less power consumption by the components of the GNSSSTS 106 allows the GNSSSTS 106 to be used in applications that are power critical and are battery operated.

FIG. 2 exemplarily illustrates components of the global navigation satellite system signal tracking system (GNSSSTS) 106 deployed in a tracking channel, for example, 105a, of the tracking channel array 105 of the global navigation satellite system (GNSS) baseband engine 102. Each of the tracking channels 105a, 105b, and 105c of the tracking channel array 105 comprises the GNSSSTS 106. The components of the GNSSSTS 106 comprise the piecewise down sampling module 109, the pseudo random noise (PRN) code generation module 113, the time multiplexed primary mixer 115, the time multiplexed phase component generation module 116, the second selector 121, the storage array 122, and the tracking engine control unit 123 as disclosed in the detailed description of FIG. 1. The GNSS baseband engine 102 further comprises a coherent memory 125 and a communication interface 126. The coherent memory 125 stores the output of the integrator and dump units 120a and 120b from the storage array 122 upon completion of a code bit period. The coherent memory 125 communicates with the coprocessor 124 via the communication interface 126. The tracking engine control unit 123 stores programming parameters for the tracking channel array 105 and provides the programming parameters to the GNSSSTS 106 in each of the tracking channels 105a, 105b, and 105c of the tracking channel array 105 at specific time instants. The coprocessor 124 facilitates transfer of the programming parameters from the tracking engine control unit 123 to the GNSSSTS 106 via the communication interface 126. The GNSSSTS 106 transfers result parameters to the coprocessor 124 via the communication interface 126.

The resettable piecewise accumulator 110 of the piecewise down sampling module 109 receives a stream of samples of intermediate frequency (IF) data and accumulates the samples of the IF data in a piecewise manner on receiving a control signal generated by the accumulation control logic unit 108 exemplarily illustrated in FIG. 1 and FIGS. 3-4. The resettable piecewise accumulator 110 generates piecewise accumulated IF values, for example, a(0), a(1), a(2), . . . , a(k-1) at different time instants, where k is the number of arms of a pseudo random noise (PRN) code bit sequence generated by the PRN code generation module 113. The piecewise storage register 111 stores the piecewise accumulated IF values generated at different time instants in storage locations 111a, 111b, and 111c of the piecewise storage register 111 that correspond to the different time instants as disclosed in the detailed description of FIG. 3. The code bit accumulator 112 sequentially accumulates the stored piecewise accumulated IF values based on a predefined combination as disclosed in the detailed descriptions of FIGS. 3-4, to continuously generate code bit accumulated values at the reduced rate fc*k, where fc is the chipping rate, at different time instants as disclosed in the detailed descriptions of FIGS. 3-4.

The first selector 114 of the global navigation satellite system signal tracking system (GNSSSTS) 106 exemplarily illustrated in FIG. 1, selects one of the stored arms of the pseudo random noise (PRN) code bit sequence and the time multiplexed primary mixer 115 mixes a code bit accumulated value with the selected arm of the PRN code bit sequence to generate a despread value corresponding to the selected arm of the PRN code bit sequence. The time multiplexed primary mixer 115 is operably connected to the secondary mixers 117a and 117b of the time multiplexed phase component generation module 116. The secondary mixers 117a and 117b are operably connected to the integrator and dump units 120a and 120b of the time multiplexed phase component generation module 116 respectively. The tracking engine control unit 123 is operably connected to the carrier numerically controlled oscillator (NCO) 119 of the time multiplexed phase component generation module 116, which in turn operably connects to the carrier generator 118 of the time multiplexed phase component generation module 116. The carrier generator 118 is operably connected to the secondary mixers 117a and 117b. The integrator and dump units 120a and 120b generate an inphase correlation component and a quadrature phase correlation component of the generated despread value corresponding to the selected arm of the PRN code bit sequence in a time multiplexed manner as disclosed in the detailed description of FIG. 1. The generated inphase correlation components and the generated quadrature phase correlation components are accumulated continuously for a defined period using the integrator and dump units 120a and 120b in a time multiplexed manner. This continuous accumulation in a time multiplexed manner requires the sampling frequency, fs, to be greater than or equal to fc*k achieved using single integrator and dump units 120a and 120b. To perform integration and dump of the inphase component and the quadrature phase component for k arms, either fs or the number of integrator and dump units 120a and 120b is increased. The storage array 122 stores the generated inphase correlation component and the generated quadrature phase correlation component of the generated despread value corresponding to the selected arm of the PRN code bit sequence in a storage location 122a, 122b, or 122c selected by the second selector 121 at different time instants of the generation of the code bit accumulated values.

FIG. 3 exemplarily illustrates the global navigation satellite system signal tracking system (GNSSSTS) 106 deployed in a single tracking channel 105a of the tracking channel array 105 of the global navigation satellite system (GNSS) baseband engine 102 exemplarily illustrated in FIGS. 1-2. The clock generator 107 is operably connected to the accumulation control logic unit 108 and the pseudo random noise (PRN) code generation module 113. The clock generator 107 is a code numerically controlled oscillator (NCO) that generates clock signals to activate the accumulation control logic unit 108 and the PRN code generation module 113. The clock generator 107 generates clock signals, also referred to as "clocks", for example, a code clock and a shift clock. The clock generator 107 transmits the code clock to the accumulation control logic unit 108 and the PRN code generation module 113. The clock generator 107 transmits the shift clock to the accumulation control logic unit 108. The accumulation control logic unit 108 utilizes the shift clock and the code clock to generate three control signals, for example, a restart control signal, an add control signal, and an arm selection control signal as disclosed in the detailed descriptions of FIGS. 6-7.

The pseudo random noise (PRN) code generation module 113 comprises a PRN code generator 113a and a PRN code register 113b. The PRN code generator 113a receives the code clock from the clock generator 107 and generates a PRN code bit sequence corresponding to a global navigation satellite system (GNSS) signal that corresponds to a satellite tracked by the tracking channel 105a. The PRN code register 113b receives the PRN code bit sequence generated by the PRN code generator 113a. The PRN code register 113b stores multiple arms of the generated PRN code bit sequence by introducing a calculated delay while storing the PRN code bit sequence in different locations of the PRN code register 113b. The first selector 114 is operably connected to the PRN code register 113b. The first selector 114 is also operably connected to the accumulation control logic unit 108 for receiving the arm selection control signal. The first selector 114 selects one of the stored arms of the generated PRN code bit sequence on receiving the arm selection control signal from the accumulation control logic unit 108 and provides the selected arm of the generated PRN code bit sequence to the time multiplexed primary mixer 115. The PRN code generation module 113 is operably connected to the piecewise down sampling module 109 via the time multiplexed primary mixer 115. The time multiplexed primary mixer 115 receives the selected arm of the generated PRN code bit sequence from the first selector 114 and the code bit accumulated value from the piecewise down sampling module 109 as exemplarily illustrated in FIG. 3.

The piecewise down sampling module 109 comprises the resettable piecewise accumulator 110, the piecewise storage register 111, and the code bit accumulator 112. The resettable piecewise accumulator 110 is operably connected to the accumulation control logic unit 108 for receiving the restart control signal. The resettable piecewise accumulator 110 receives a stream of samples of zero or near zero intermediate frequency (IF) data at a frequency fs from the radio frequency (RF) down converter 101, or in an embodiment, from the carrier frequency offset module 103 operably connected to the piecewise down sampling module 109 in the global navigation satellite system (GNSS) baseband engine 102 exemplarily illustrated in FIG. 1 and as disclosed in the detailed description of FIG. 1. The resettable piecewise accumulator 110 starts accumulating the samples of the IF data on receiving the restart control signal from the accumulation control logic unit 108 as disclosed in the detailed descriptions of FIGS. 6-7. The resettable piecewise accumulator 110 accumulates the samples of the IF data until a successive restart control signal is received from the accumulation control logic unit 108. Upon receiving the successive restart control signal from the accumulation control logic unit 108, the resettable piecewise accumulator 110 generates a piecewise accumulated IF value at the time instant the resettable piecewise accumulator 110 receives the successive restart control signal and stores the generated accumulated IF value in a storage location 111a, 111b, or 111c of the piecewise storage register 111 corresponding to the time instant of generation of the piecewise accumulated IF value as disclosed in the detailed description of FIG. 4.

The piecewise storage register 111 is operably connected to the resettable piecewise accumulator 110 for receiving and storing the generated accumulated intermediate frequency (IF) values in the storage locations 111a, 111b, and 111c of the piecewise storage register 111 corresponding to the different time instants. The resettable piecewise accumulator 110 is reset after receiving the successive restart control signal and starts accumulating forthcoming samples of the IF data to continuously generate the piecewise accumulated IF values. The code bit accumulator 112 is operably connected to the piecewise storage register 111. The code bit accumulator 112 sequentially accumulates the stored piecewise accumulated IF values from a predefined combination of the storage locations 111a, 111b, and 111c of the piecewise storage register 111 over a code bit period. The code bit accumulator 112 is also operably connected to the accumulation control logic unit 108 for receiving the add control signal. The code bit accumulator 112 generates the code bit accumulated values at different time instants at the reduced rate, that is, fc*k, where fc is the chipping rate and k is the number of arms of the pseudo random noise (PRN) code bit sequence, on receiving the add control signal from the accumulation control logic unit 108 as disclosed in the detailed descriptions of FIGS. 6-7. The code bit accumulator 112 continuously transmits the code bit accumulated values generated at different time instants to the time multiplexed primary mixer 115.

The time multiplexed primary mixer 115 is operably connected to the first selector 114 and the code bit accumulator 112 of the piecewise down sampling module 109. At a particular time instant, the time multiplexed primary mixer 115 mixes the selected arm of the generated pseudo random noise (PRN) code bit sequence and the code bit accumulated value generated at that time instant and generates the despread value corresponding to the selected arm of the generated PRN code bit sequence. The time multiplexed phase component generation module 116 is operably connected to the time multiplexed primary mixer 115. The time multiplexed phase component generation module 116 comprises the carrier numerically controlled oscillator (NCO) 119, the carrier generator 118, the secondary mixers 117a and 117b, and the integrator and dump units 120a and 120b. The carrier generator 118 is operably connected to the carrier NCO 119. The secondary mixers 117a and 117b are operably connected to the time multiplexed primary mixer 115 and the carrier generator 118. The integrator and dump units 120a and 120b are operably connected to the secondary mixers 117a and 117b respectively. The time multiplexed phase component generation module 116 generates the inphase correlation component and the quadrature phase correlation component of the generated despread value as disclosed in the detailed description of FIG. 1.

The second selector 121 is operably connected to the time multiplexed phase component generation module 116. The second selector 121 is also operably connected to the accumulation control logic unit 108 for receiving the arm selection control signal. On receiving the arm selection control signal from the accumulation control logic unit 108, the second selector 121 selects one of the storage locations 122a, 122b, and 122c in the storage array 122 to store the generated inphase correlation component and the generated quadrature phase correlation component of the despread value generated by the time multiplexed phase component generation module 116. The second selector 121 performs this selection based on the selected arm of the pseudo random noise (PRN) code bit sequence for different time instants of generation of the code bit accumulated values. In an embodiment, the sizes of the PRN code register 113b and the storage array 122 are equal. The storage array 122 operably connected to the time multiplexed phase component generation module 116 via the second selector 121 stores the generated inphase correlation component and the generated quadrature phase correlation component of the generated despread value in the selected storage location 122a, 122b, or 122c of the storage array 122. The first selector 114, the time multiplexed primary mixer 115, the time multiplexed phase component generation module 116, and the storage array 122 perform their respective functions continuously for each of the code bit accumulated values generated at corresponding time instants in a time multiplexed manner.

FIG. 4 exemplarily illustrates code bit clock generation and code bit accumulation performed in the global navigation satellite system signal tracking system (GNSSSTS) 106. The clock generator 107 generates the code clock and the shift clock that are provided to the accumulation control logic unit 108. The accumulation control logic unit 108 comprises a shift register 108a and an accumulation control logic block 108b. The shift register 108a operates on the shift clock and stores the samples of the code clock. Locations of the shift register 108a are tapped based on a chip spacing required to generate a code bit clock from each tapped location. As used herein, "chip spacing" refers to a distance between time instants of existence of the early arm of the pseudo random noise (PRN) code bit sequence and the prompt arm of the PRN code bit sequence and a distance between time instants of existence of the prompt arm of the PRN code bit sequence and the late arm of the PRN code bit sequence.

The accumulation control logic block 108b receives the code bit clocks from the shift register 108a and provides a one sampling clock wide pulse, that is, the restart control signal, for a rising edge of each code bit clock as disclosed in the detailed descriptions of FIGS. 6-7. The resettable piecewise accumulator 110 of the piecewise down sampling module 109 comprises an accumulator 110a, a counter 110b, and a piecewise selector 110c. The accumulator 110a receives and accumulates the stream of samples of zero or near zero intermediate frequency (IF) data on receiving the restart control signal from the accumulation control logic unit 108 and generates piecewise accumulated IF values, for example, a(0), a(1), a(2), . . . , and a(k-1) continuously at different time instants, where k is the number of arms of the pseudo random noise (PRN) code bit sequence. The counter 110b acts as an address pointer to store the piecewise accumulated IF values in a circular buffer manner. The piecewise selector 110c selects the storage locations 111a, 111b, and 111c in the piecewise storage register 111, on receiving a counter signal generated by the counter 110b, for storing the continuously generated piecewise accumulated IF values. The counter signal triggers the storage of the continuously generated piecewise accumulated IF values in the piecewise storage register 111 in a circular buffer manner, where the continuously generated piecewise accumulated IF values are stored in the piecewise storage register 111 from a first storage location 111a to a last storage location 111c. When the generated piecewise accumulated IF values are beyond the size of the piecewise storage register 111, the recently generated piecewise accumulated IF values are stored in the piecewise storage register 111 by overwriting the previously stored piecewise accumulated IF values in the first storage location 111a and continuing to overwrite the piecewise accumulated IF values till the last storage location 111c.

The code bit accumulator 112 accumulates all the piecewise accumulated intermediate frequency (IF) values stored in the piecewise storage register 111 on receiving the add control signal from the accumulation control logic unit 108. The pseudo random noise (PRN) code generation module 113 comprising the PRN code generator 113a and the PRN code register 113b generates the PRN code bit sequence corresponding to a global navigation satellite system (GNSS) signal and stores the arms of the PRN code bit sequence. On receiving the arm selection control signal from the accumulation control logic unit 108, the first selector 114 selects one of the stored arms of the PRN code bit sequence at different time instants of the generation of the code bit accumulated values and provides the selected arm of the PRN code bit sequence to the time multiplexed primary mixer 115. The time multiplexed primary mixer 115 mixes the selected arm of the PRN code bit sequence with the code bit accumulated value generated at a particular time instant and generates the despread value corresponding to the selected arm of the PRN code bit sequence as disclosed in the detailed description of FIG. 3. The despread value corresponding to the selected arm of the generated PRN code bit sequence is provided to the time multiplexed phase component generation module 116 to generate the inphase correlation component and the quadrature phase correlation component of the despread value corresponding to the selected arm of the generated PRN code bit sequence. The generated inphase correlation component and the quadrature phase correlation component of the despread value are stored in the storage array 122 when the second selector 121 receives an arm selection control signal from the accumulation control logic unit 108 as disclosed in the detailed descriptions of FIGS. 1-3. The functions performed by the time multiplexed primary mixer 115, the time multiplexed phase component generation module 116, and the storage array 122 are continuous for each of the code bit accumulated values generated by the piecewise down sampling module 109 at different time instants.

FIG. 5 exemplarily illustrates a table showing output frequency of the clock generator 107 of the global navigation satellite system signal tracking system (GNSSSTS) 106 exemplarily illustrated in FIG. 1 and FIGS. 3-4. Consider an example where the clock generator 107 is a 32-bit numerically controlled oscillator (NCO) operating at a frequency fs equal to about 65.472 MHz with a chip spacing equal to about 0.125 and a chipping rate fc equal to about 1.023 MHz. The code bit period is the inverse of the chipping rate. One or more bits of the clock generator 107 can be tapped to generate control signals of varied frequencies. The output frequency fout of the clock generator 107 is equal to $$\text{Inc\_word} * \frac{f_s}{2^{x+1}},$$

where Inc_word is a phase increment word for the clock generator 107 to generate a control signal of a required frequency fs, which is the operating frequency of the clock generator 107, and x is a bit number of the clock generator 107. The code clock and the shift clock are generated by tapping different bits of the clock generator 107. The shift clock is greater than 2*chipping rate. In the above example, by tapping the 31$^{st}$ bit of the clock generator 107, the clock generator 107 generates a code clock of frequency 1.023 MHz and by tapping the 28$^{th}$ bit of the clock generator 107, the clock generator 107 generates a shift clock of frequency 8.184 MHz as exemplarily illustrated in FIG. 5.

FIG. 6 exemplarily illustrates a method for generating control signals and controlling operations of the global navigation satellite system signal tracking system (GNS-SSTS) 106 exemplarily illustrated in FIGS. 1-4. After the GNSSSTS 106 is powered on, an operator of the GNSSSTS 106 programs 601 the clock generator 107 exemplarily illustrated in FIG. 1 and FIGS. 3-4, and number of the arms, k, of the pseudo random noise (PRN) code bit sequence with a chip spacing of the GNSSSTS 106 to allow the clock generator 107 to generate a required code clock. Consider an example where the operator programs the clock generator 107 to generate an "x" code frequency and three arms of the PRN code bit sequence with a chip spacing of 0.25. The clock generator 107 generates 602 a code bit clock for each arm of the PRN code bit sequence, that is, a code bit clock 0 for the first arm of the PRN code bit sequence up to a code bit clock k-1 for the k$^{th}$ arm of the PRN code bit sequence using a shift clock on the shift register 108a exemplarily illustrated in FIG. 4. For example, if the number of arms k=3, then the code bit clocks are code bit clock(0)—early, code bit clock(1)—prompt, and code bit clock(2)—late.

The accumulation control logic unit 108 exemplarily illustrated in FIG. 1 and FIGS. 3-4, generates 603 a restart control signal on the rising edge of each of the code bit clocks, for example, the code bit clock(0)—early, the code bit clock(1)—prompt, and the code bit clock(2)—late, generated for the early, prompt, and late arms of the pseudo random noise (PRN) code bit sequence respectively, as exemplarily illustrated in FIG. 7. The resettable piecewise accumulator 110 exemplarily illustrated in FIGS. 1-4, receives and resamples or accumulates 604 incoming samples of intermediate frequency (IF) data in a piecewise manner, that is, performs piecewise accumulation, until the next restart control signal pulse is detected as disclosed in the detailed description of FIG. 4. The resettable piecewise accumulator 110 generates a piecewise accumulated IF value at the time instant of the rising edge of the successive restart control signal. The piecewise storage register 111 exemplarily illustrated in FIGS. 1-4, stores 605 the generated resampled or the piecewise accumulated IF value in a circular buffer manner, for example, as a(0), a(1), and a(2) stored one after the other as disclosed in the detailed description of FIG. 4.

On the subsequent rising edge of the code bit clock associated with the arm of the pseudo random noise (PRN) code bit sequence, the code bit accumulator 112 exemplarily illustrated in FIGS. 1-4, accumulates 606 the contents of the piecewise storage register 111 which results in a piecewise accumulated intermediate frequency (IF) value over a code bit period, that is, a code bit accumulated value for one arm of the PRN code bit sequence. This accumulation is repeated this for all the arms of the PRN code bit sequence. The code bit accumulator 112 accumulates the contents of the piecewise storage register 111 over a chip or code bit period, on receiving the add control signal that is generated in accordance with the subsequent rising edges of the code bit clocks, that is, the rising edge of the code bit clock(0)—early, the rising edge of the code bit clock(1)—prompt, and the rising edge of the code bit clock(2)—late as exemplarily illustrated in FIG. 7, associated with all the arms of the PRN code bit sequence. For example, on the second rising edge of the code bit clock(0)—early, the resettable piecewise accumulator 110 accumulates and stores the piecewise accumulated IF values a(0), a(1), and a(2) in the storage locations 111a, 111b, and 111c of the piecewise storage register 111 exemplarily illustrated in FIGS. 2-4, respectively. The accumulation control logic block 108b of the accumulation control logic unit 108 exemplarily illustrated in FIG. 4, receives the code bit clock(0), the code bit clock(1), and the code bit clock(2) and generates the add control signal on detecting the rising edge of each of the code bit clocks, that is, the code bit clock(0)—early, the code bit clock(1)—prompt, and the code bit clock(2)—late. Each rising edge of the add control signal is dependent on the rising edge of the code bit clock(0)—early, or the rising edge of the code bit clock(1)—prompt, or the rising edge of the code bit clock(2)—late.

The accumulation control logic unit 108 generates 607 an arm selection control signal based on the occurrence of the rising edge of each of the code bit clocks associated with the arms of the pseudo random noise (PRN) code bit sequence, that is, based on the occurrence of the rising edge of each of the code bit clocks, code bit clock(0)—early, code bit clock(1)—prompt, and code bit clock(2)—late. For example, on the second rising edge of the code bit clock (0)—early, the arm selection control signal corresponds to an early arm of the PRN code bit sequence as exemplarily illustrated in FIG. 7. The arm selection control signal is provided to the first selector 114 exemplarily illustrated in FIG. 1 and FIGS. 3-4, for selecting one of the stored arms of the PRN code bit sequence. The time multiplexed primary mixer 115 exemplarily illustrated in FIG. 1-4, receives 608 the input code bit accumulated value from the code bit accumulator 112 and the selected arm of the PRN code bit sequence from the first selector 114 at a particular time instant for further processing as disclosed in the detailed description of FIG. 3.

FIG. 7 exemplarily illustrates a timing diagram showing generation of the control signals and control of the operations of the global navigation satellite system signal tracking system (GNSSSTS) 106 exemplarily illustrated in FIGS. 1-4. Consider an example where the frequency of the shift clock generated by the clock generator 107 exemplarily illustrated in FIG. 1 and FIGS. 3-4, is equal to 8.184 MHz, and the number of arms of the pseudo random noise (PRN) code bit sequence, k, is 3 with a chip spacing of 0.25. The clock generator 107 generates a code bit clock(0)—early, a code bit clock(1)—prompt, and a code bit clock(2)—late using the shift clock as disclosed in the detailed description of FIG. 4. The accumulation control logic unit 108 exemplarily illustrated in FIG. 1 and FIGS. 3-4, generates a restart control signal at the rising edges of the code bit clock(0)—early, the code bit clock(1)—prompt, and the code bit clock(2)—late. The resettable piecewise accumulator 110 of the piecewise down sampling module 109 exemplarily illustrated in FIGS. 1-4, receives and accumulates a stream of samples of intermediate frequency (IF) data until a successive restart control signal is provided to the resettable piecewise accumulator 110 by the accumulation control logic unit 108, and continuously generates the piecewise accumulated IF values as disclosed in the detailed description of FIG. 4. The piecewise accumulated IF values are stored in the piecewise storage register 111 exemplarily illustrated in FIGS. 1-4 and as disclosed in the detailed description of FIG. 4. The code bit accumulator 112 exemplarily illustrated in FIGS. 1-4, generates a code bit accumulated value at each of the different time instants by sequentially accumulating the stored piecewise accumulated IF values, on receiving the add control signal from the accumulation control logic unit 108 as disclosed in the detailed description of FIG. 6. The first selector 114 exemplarily illustrated in FIG. 1 and FIGS. 3-4, selects one of the stored arms of the PRN code bit sequence on receiving the arm selection control signal from the accumulation control logic unit 108, that corresponds to the subsequent rising edge of one of the code bit clocks, that is, the code bit clock(0)—early, the code bit clock(1)—prompt, and the code bit clock(2)—late as disclosed in the detailed description of FIG. 6.

In an example as illustrated in FIG. 7, after the global navigation satellite system signal tracking system (GNSSTS) 106 is powered on, an operator programs the clock generator 107 to generate a code clock of frequency "x" and programs the number of arms, k, as 3 with a chip spacing of 0.25. The accumulation control logic unit 108 generates code bit clocks for three arms, that is, a code bit clock(0)—early, a code bit clock(1)—prompt, and a code bit clock (2)—late using the shift register 108a exemplarily illustrated in FIG. 4. The accumulation control logic unit 108 generates a restart control signal on detecting the rising edges of the code bit clock(0)—early, the code bit clock(1)—prompt, and the code bit clock(2)—late. The accumulator 110a of the resettable piecewise accumulator 110 exemplarily illustrated in FIG. 4, receives and starts accumulating a stream of samples of the intermediate frequency (IF) data at a first rising edge of the restart control signal corresponding to the first rising edge of the code bit clock(0)—early. The accumulator 110a of the resettable piecewise accumulator 110 generates a first piecewise accumulated IF value a(0) at a second rising edge of the restart control signal corresponding to a first rising edge of the code bit clock(1)—prompt and stores the generated first piecewise accumulated IF value a(0) in the storage location 111a of the piecewise storage register 111 in a circular buffer manner as exemplarily illustrated in FIG. 4.

The accumulator 110a of the resettable piecewise accumulator 110 receives and starts accumulating the stream of samples of the intermediate frequency (IF) data at the second rising edge of the restart control signal corresponding to a first rising edge of the code bit clock(1)—prompt. The accumulator 110a of the resettable piecewise accumulator 110 generates a first piecewise accumulated IF value a(1) at a third rising edge of the restart control signal corresponding to a first rising edge of the code bit clock (2)—late and stores the generated first piecewise accumulated IF value a(1) in the storage location 111b of the piecewise storage register 111 in a circular buffer manner as exemplarily illustrated in FIG. 4. The accumulator 110a of the resettable piecewise accumulator 110 receives and starts accumulating the stream of samples of the IF data at the third rising edge of the restart control signal corresponding to the first rising edge of the code bit clock(2)—late. The accumulator 110a of the resettable piecewise accumulator 110 generates a first piecewise accumulated IF value a(2) at a fourth rising edge of the restart control signal corresponding to a second rising edge of the code bit clock(0)—early and stores the generated first piecewise accumulated IF value a(2) in the storage location 111c of the piecewise storage register 111 in a circular buffer manner as exemplarily illustrated in FIG. 4. The code bit accumulator 112 accumulates the first stored piecewise accumulated IF value a(0), the first stored piecewise accumulated IF value a(1), and the first stored piecewise accumulated IF value a(2) at a first rising edge of the add control signal corresponding to the second rising edge of the code bit clock(0)—early and generates a code bit accumulated value over a code bit period for the early arm at the time instant when the first rising edge of the add control signal corresponds to the second rising edge of the code bit clock(0)—early. The first selector 114 selects the early arm of the pseudo random noise (PRN) code bit sequence based on the arm selection control signal that corresponds to the second rising edge of code bit clock(0)—early at the time instant of generation of the code bit accumulated value.

The accumulator 110a of the resettable piecewise accumulator 110 receives and starts accumulating a stream of samples of the intermediate frequency (IF) data at the fourth rising edge of the restart control signal corresponding to the second rising edge of the code bit clock(0)—early. The accumulator 110a of the resettable piecewise accumulator 110 generates a second piecewise accumulated IF value a(0) at the fifth rising edge of the restart control signal corresponding to the second rising edge of the code bit clock (1)—prompt and stores the generated second piecewise accumulated IF value a(0) in the piecewise storage register 111 in a circular buffer manner, such that the first stored piecewise accumulated IF value a(0) is overwritten by the second piecewise accumulated IF value a(0) at the location 111a of the piecewise storage register 111. The code bit accumulator 112 accumulates the stored second piecewise accumulated IF value a(0), the stored first piecewise accumulated IF value a(1), and the stored first piecewise accumulated IF value a(2) at the second rising edge of the add control signal corresponding to the second rising edge of the code bit clock(1)—prompt. The accumulator 110a of the resettable piecewise accumulator 110 continues generating piecewise accumulated IF values and storing the generated piecewise accumulated IF values in the piecewise storage register 111 based on the forthcoming rising edges of the restart control signal. The code bit accumulator 112 continues accumulating the stored piecewise accumulated IF values based on the rising edges of the add control signal, that is, on every rising edge of the code bit clocks. The first selector 114 selects one of the arms of the pseudo random noise (PRN) code bit sequence based on the arm selection control signal that corresponds to the rising edge of one of the subsequent code bit clocks, that is, the code bit clock (0)—early, the code bit clock(1)—prompt, and the code bit clock(2)—late.

Figure 8:
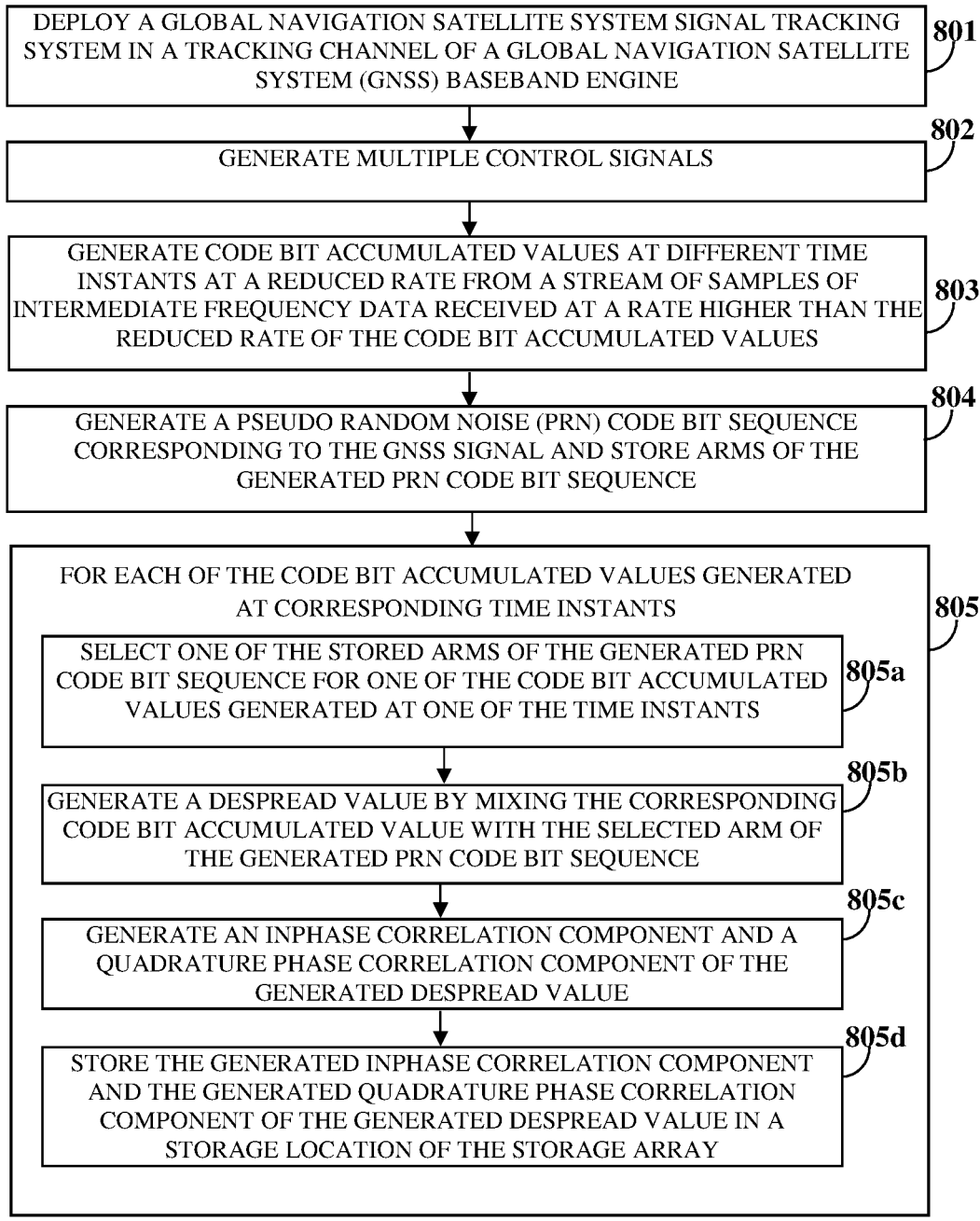
FIG. 8 exemplarily illustrates a method for tracking a global navigation satellite system signal using the global navigation satellite system signal tracking system.

FIG. 8 exemplarily illustrates a method for tracking a global navigation satellite system (GNSS) signal using the global navigation satellite system signal tracking system (GNSSSTS) 106 exemplarily illustrated in FIGS. 1-4. In the method disclosed herein, the GNSSSTS 106 comprising the accumulation control logic unit 108, the piecewise down sampling module 109, the pseudo random noise (PRN) code generation module 113, the first selector 114, the time multiplexed primary mixer 115, the time multiplexed phase component generation module 116, the second selector 121, and the storage array 122 is deployed 801 in the tracking channel 105a of the tracking channel array 105 of the GNSS baseband engine 102 as exemplarily illustrated in FIGS. 1-4. The accumulation control logic unit 108 generates 802 multiple control signals as disclosed in the detailed description of FIG. 6. On receiving at least two of the control signals, for example, the restart control signal and the add control signal, from the accumulation control logic unit 108, the piecewise down sampling module 109 comprising the resettable piecewise accumulator 110, the piecewise storage register 111, and the code bit accumulator 112 exemplarily illustrated in FIGS. 1-4, generates 803 code bit accumulated values at different time instants at a reduced rate, fc*k, where fc is the chipping rate and k is the number of arms of the PRN code bit sequence, from a stream of samples of intermediate frequency (IF) data received at a rate, fs, that is higher than the reduced rate of the code bit accumulated values. The PRN code generation module 113 comprising the PRN code generator 113a and the PRN code register 113b exemplarily illustrated in FIGS. 3-4, generates 804 a PRN code bit sequence corresponding to the GNSS signal and stores the arms of the generated PRN code bit sequence.

For each of the code bit accumulated values generated at corresponding time instants 805, the following method steps 805a to 805d are performed. The first selector 114 selects 805a one of the stored arms of the generated pseudo random noise (PRN) code bit sequence for one of the code bit accumulated values generated at one of the time instants, on receiving another of one of the control signals, that is, the arm selection control signal from the accumulation control logic unit 108. The time multiplexed primary mixer 115 generates 805b a despread value corresponding to the selected arm of the PRN code bit sequence by mixing the code bit accumulated value with the selected stored arm of the generated PRN code bit sequence. The time multiplexed phase component generation module 116 comprising the carrier numerically controlled oscillator (NCO) 119, the carrier generator 118, the secondary mixers 117a and 117b, and the integrator and dump units 120a and 120b exemplarily illustrated in FIGS. 1-3, generates 805c an inphase correlation component and a quadrature phase correlation component of the generated despread value corresponding to the selected arm of the PRN code bit sequence as disclosed in the detailed description of FIG. 1. The generated inphase correlation component and the generated quadrature phase correlation component are accumulated continuously over the integration period using the integrator and dump units 120a and 120b in a time multiplexed manner. The storage array 122 stores 805d the generated inphase correlation component and the generated quadrature phase correlation component of the generated despread value corresponding to the selected arm of the PRN code bit sequence in a storage location 122a, 122b, or 122c of the storage array 122 selected by the second selector 121 exemplarily illustrated in FIGS. 2-4, based on the selected arm of the PRN code bit sequence.

Figure 9A:
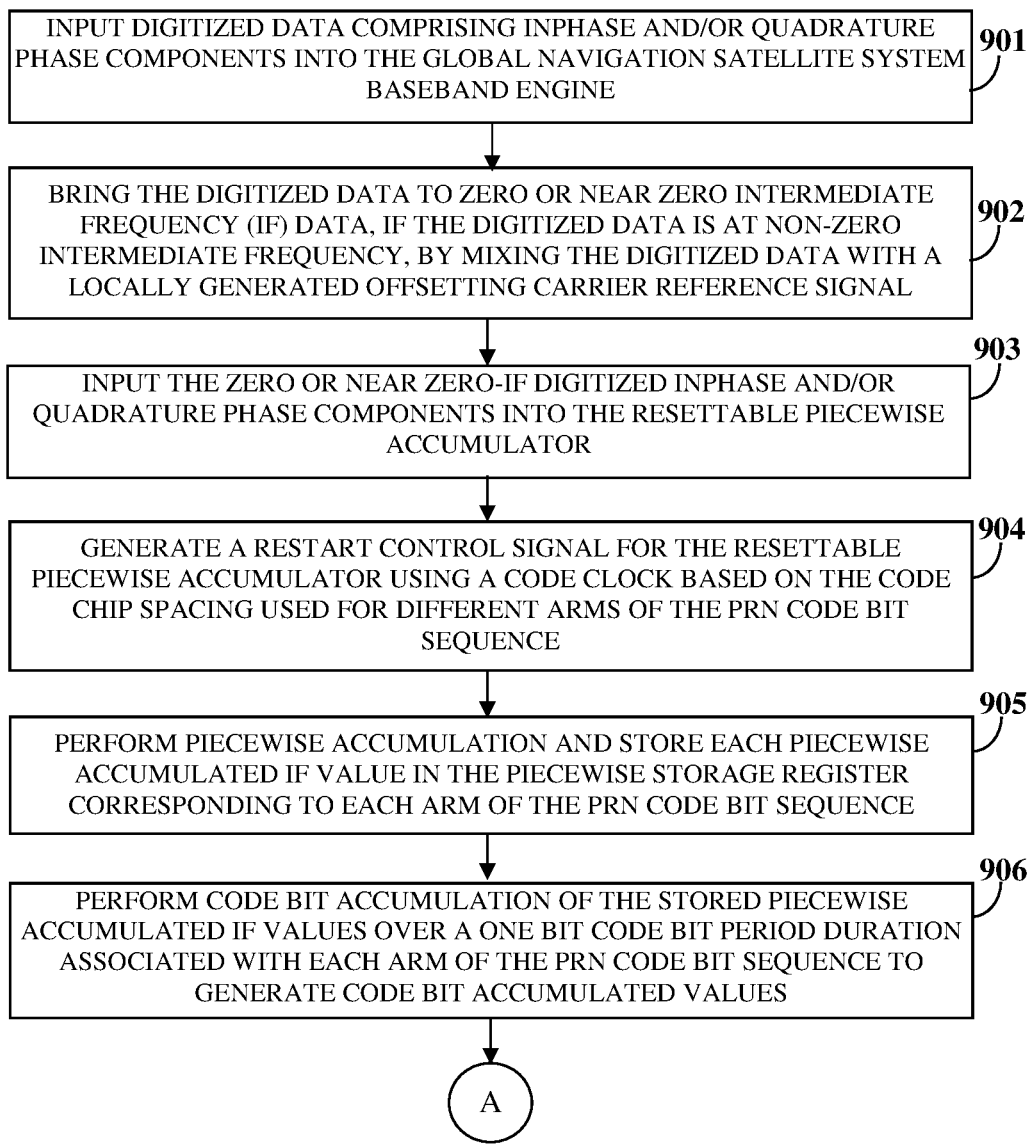
FIGS. 9A-9B exemplarily illustrate a method for setting up the global navigation satellite system signal tracking system and tracking a global navigation satellite system signal using the global navigation satellite system signal tracking system.
Figure 9B:
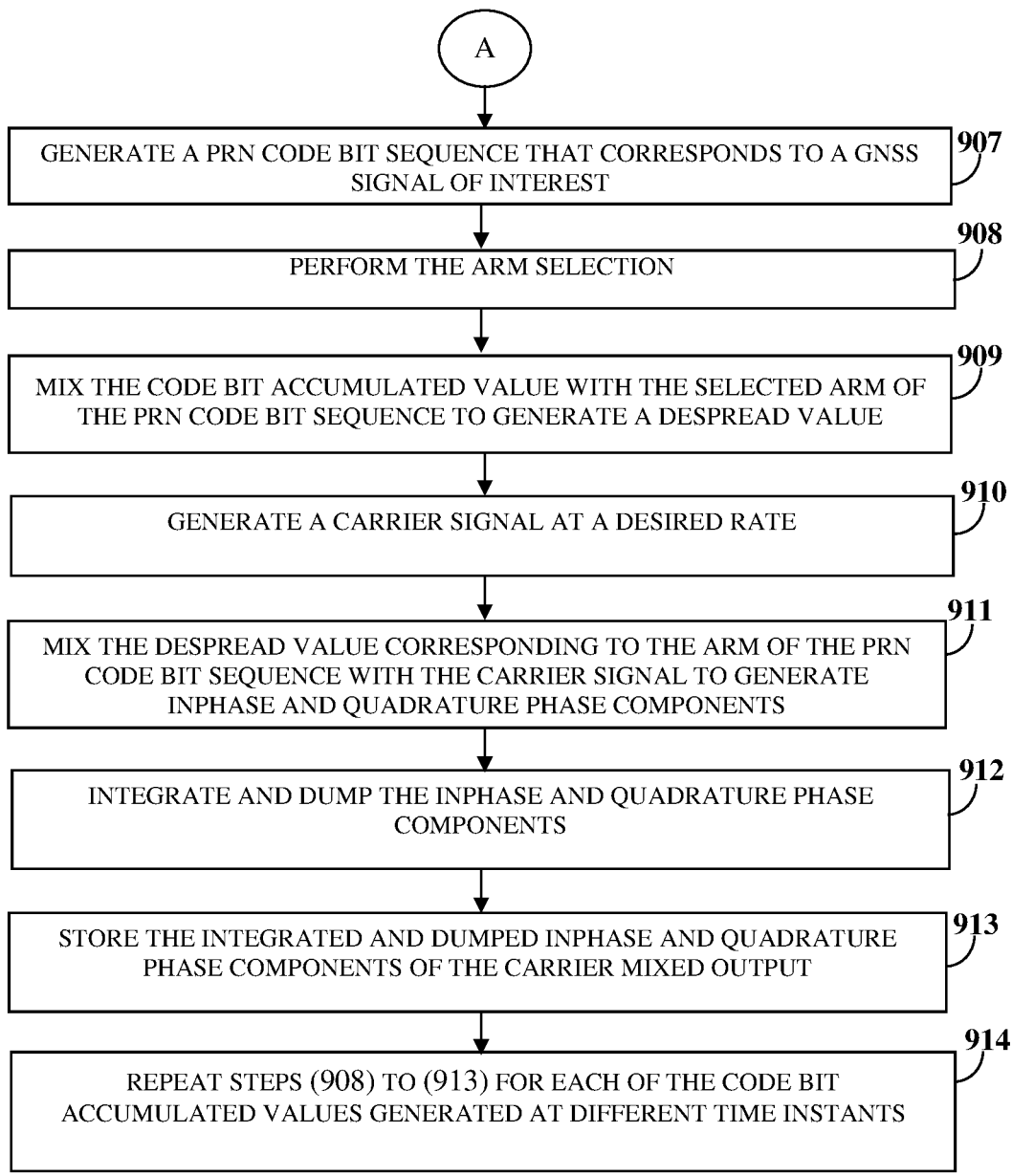

FIGS. 9A-9B exemplarily illustrate a method for setting up the global navigation satellite system signal tracking system (GNSSSTS) 106 and tracking a global navigation satellite system (GNSS) signal using the GNSSSTS 106 exemplarily illustrated in FIGS. 1-4. An analog to digital converter (ADC) (not shown) in the radio frequency (RF) down converter 101 of the GNSS receiver 100 exemplarily illustrated in FIG. 1, generates digitized data comprising inphase and/or quadrature phase components corresponding to the GNSS signal and inputs 901 the digitized data into the GNSS baseband engine 102 exemplarily illustrated in FIGS. 1-2. The carrier frequency offset module 103 exemplarily illustrated in FIG. 1, brings 902 the digitized data to zero or near zero intermediate frequency (IF) data, if the digitized data is at non-zero IF, by mixing the digitized data with a locally generated offsetting carrier reference signal with a frequency equal to the IF. The carrier frequency offset module 103 inputs 903 a stream of samples of the zero or near zero-IF data, that is, the zero or near zero-IF digitized inphase and/or quadrature phase into the resettable piecewise accumulator 110 of the piecewise down sampling module 109 exemplarily illustrated in FIGS. 1-4.

The accumulation control logic unit 108 generates three control signals, that is, a restart control signal, an add control signal, and an arm selection control signal using a code clock and a shift clock generated by the clock generator 107 exemplarily illustrated in FIGS. 3-4 and as disclosed in the detailed descriptions of FIGS. 4-7. As exemplarily illustrated in FIG. 9A, the accumulation control logic unit 108 generates 904 a restart control signal for the resettable piecewise accumulator 110, that is, to activate the resettable piecewise accumulator 110, using a code clock based on a code chip spacing used for different arms of the pseudo random noise (PRN) code bit sequence. The resettable piecewise accumulator 110 performs piecewise accumulation 905 of the received samples of the intermediate frequency (IF) data at the rising edge of the restart control signal as disclosed in the detailed description of FIG. 7, and stores each piecewise accumulated IF value in the piecewise storage register 111 exemplarily illustrated in FIGS. 1-4, corresponding to each arm of the PRN code bit sequence.

The resettable piecewise accumulator 110 continuously generates piecewise accumulated intermediate frequency (IF) values from a(0) to a(k-1), where k is the number of arms of the pseudo random noise (PRN) code bit sequence. The resettable piecewise accumulator 110 generates a first piecewise accumulated IF value a(0) at the next rising edge of the restart control signal and stores a(0) in the piecewise storage register 111 of the piecewise down sampling module 109 in a storage location, for example, 111a, of the piecewise storage register 111 exemplarily illustrated in FIGS. 2-4, corresponding to a time instant of generation of the first piecewise accumulated IF value a(0) as disclosed in the detailed description of FIG. 7. The resettable piecewise accumulator 110 also generates a first piecewise accumulated IF value a(1) and a first piecewise accumulated IF value a(2) on detecting the rising edges of the restart control signal and stores the piecewise accumulated IF values in the storage locations, for example, 111b and 111c exemplarily illustrated in FIGS. 2-4, respectively, of the piecewise storage register 111 corresponding to the time instants of generation of the piecewise accumulated IF values as disclosed in the detailed description of FIG. 7. The code bit accumulator 112 of the piecewise down sampling module 109 exemplarily illustrated in FIGS. 1-4, performs code bit accumulation 906 of the stored piecewise accumulated IF values over a one bit code bit period duration associated with each arm of the PRN code bit sequence to generate code bit accumulated values. That is, the code bit accumulator 112 accumulates the stored first piecewise accumulated IF value a(0), the stored first piecewise accumulated IF value a(1), and the stored first piecewise accumulated IF value a(2) to generate a code bit accumulated value on detecting the rising edge of the add control signal. The code bit accumulator 112 accumulates the stored piecewise accumulated IF values over a one bit code bit period duration associated with each arm of the PRN code bit sequence as $A(k)=\Sigma a(n)$, where n=0 to k−1 and k is the number of arms of the PRN code bit sequence, and generates the code bit accumulated values at different time instants continuously.

The pseudo random noise (PRN) code generator 113a exemplarily illustrated in FIGS. 3-4, generates 907 a PRN code bit sequence that corresponds to the global navigation satellite system (GNSS) signal of interest based on the code clock as disclosed in the detailed description of FIG. 6, and the PRN code register 113b exemplarily illustrated in FIGS. 3-4, stores an early arm, a prompt arm, and a late arm of the PRN code bit sequence as disclosed in the detailed descriptions of FIGS. 6-7. For each of the code bit accumulated values generated at different time instants, the first selector 114 exemplarily illustrated in FIG. 1 and FIGS. 3-4, performs arm selection 908, that is, selects one of the arms of the PRN code bit sequence from the PRN code register 113b on receiving the arm selection control signal from the accumulation control logic unit 108. The time multiplexed primary mixer 115 exemplarily illustrated in FIGS. 1-4, mixes 909 the generated code bit accumulated value with the selected arm of the PRN code bit sequence to generate a despread value corresponding to the selected arm of the PRN code bit sequence.

The carrier generator 118 exemplarily illustrated in FIGS. 1-3, generates 910 a carrier signal based on a carrier reference signal generated by the carrier numerically controlled oscillator (NCO) 119 exemplarily illustrated in FIGS. 1-3, at a rate fs/M, where M=3. Therefore, the carrier generator 118 generates the carrier signal at a rate 21.824 MHz, when fs is 65.472 MHz. The secondary mixers 117a and 117b exemplarily illustrated in FIGS. 1-3, mix 911 the generated despread value corresponding to the selected arm of the pseudo random noise (PRN) code bit sequence with the carrier signal generated by the carrier generator 118 to generate an inphase component and a quadrature phase component of the generated despread value respectively, corresponding to the selected arm of the PRN code bit sequence. The integrator and dump units 120a and 120b exemplarily illustrated in FIGS. 1-3, integrate and dump 912 the inphase component and the quadrature phase component of the generated despread value respectively, to generate an inphase correlation component and a quadrature phase correlation component of the generated despread value respectively. The integrator and dump units 120a and 120b integrate the inphase component and the quadrature phase component of the generated despread value respectively, with a previously generated inphase component and a previously generated quadrature phase component of a previously generated despread value respectively, corresponding to the same selected arm of the PRN code bit sequence. The second selector 121 exemplarily illustrated in FIGS. 1-4, selects a location 122a, 122b, or 122c in the storage array 122 exemplarily illustrated in FIGS. 2-4, corresponding to the selected arm of the PRN code bit sequence on receiving the arm selection control signal from the accumulation control logic unit 108, for storing the generated inphase correlation component and the generated quadrature phase correlation component of the generated despread value. That is, the storage array 122 stores 913 the integrated and dumped inphase and quadrature phase components of the carrier mixed output in the selected storage location 122a, 122b, or 122c exemplarily illustrated in FIGS. 2-4, corresponding to the selected arm of the PRN code bit sequence on receiving the arm selection control signal from the accumulation control logic unit 108. The method steps 908 to 913 are repeated 914 for each of the code bit accumulated values generated at different time instants.

Consider an example of a global navigation satellite system (GNSS) receiver 100 with 64 parallel tracking channels 105a to 105c exemplarily illustrated in FIGS. 1-2, that receive a stream of samples of intermediate frequency (IF) data at a rate, fs, equal to 65.472 MHz with the number of arms of the pseudo random noise (PRN) code bit sequence, k equal to 3, and a global positioning system (GPS) coarse/acquisition (C/A) code chip rate equal to 1.023 MHz. An operator powers on the global navigation satellite system signal tracking system (GNSSSTS) 106, for example, in the tracking channel 105a exemplarily illustrated in FIGS. 1-4, and programs the clock generator 107 and number of the arms of the PRN code bit sequence, k as 3, along with a chip spacing of 0.25 for the GNSSSTS 106 to generate the code clock. The three arms of the PRN code bit sequence are an early arm, a prompt arm, and a late arm. The clock generator 107 generates the code clock and the shift clock that are provided to the accumulation control logic unit 108. The shift register 108a of the accumulation control logic unit 108 exemplarily illustrated in FIG. 4, operates based on the shift clock and stores samples of the code clock. Locations of the shift register 108a are tapped with a required chip spacing to obtain a code bit clock from each tapped location that corresponds to an arm of the PRN code bit sequence. The shift register 108a provides a code bit clock(0)—early for the early arm of the PRN code bit sequence, a code bit clock(1)—prompt for the prompt arm of the PRN code bit sequence, and a code bit clock(2)—late for the late arm of the PRN code bit sequence. The accumulation control logic block 108b of the accumulation control logic unit 108 exemplarily illustrated in FIG. 4, receives the code bit clock(0)—early, the code bit clock(1)—prompt, and the code bit clock(2)—late and generates a restart control signal, that is, a one sampling clock wide pulse on the rising edge of each code bit clock, that is, the code bit clock(0)—early, the code bit clock(1)—prompt, and the code bit clock(2)—late as exemplarily illustrated in FIG. 7.

The resettable piecewise accumulator 110 comprises the accumulator 110a, the counter 110b, and the piecewise selector 110c as exemplarily illustrated in FIG. 4. The accumulator 110a of the resettable piecewise accumulator 110 receives the stream of samples of the zero or near zero intermediate frequency (IF) data at the rate fs from the radio frequency (RF) down converter 101, or in an embodiment, from the carrier frequency offset module 103, and accumulates the received samples of the IF data on receiving a first restart control signal from the accumulation control logic unit 108. The accumulator 110a accumulates the samples of the IF data until a second restart control signal is received from the accumulation control logic unit 108. Upon receiving the second restart control signal from the accumulation control logic unit 108, the accumulator 110a generates a first piecewise accumulated IF value a(0) at the time instant that the accumulator 110a receives the second restart control signal from the accumulation control logic unit 108, stores the generated first piecewise accumulated IF value a(0) in a storage location 111a of the piecewise storage register 111, and starts receiving and accumulating the samples of the IF data until a third restart control signal is received from the accumulation control logic unit 108. The piecewise selector 110c selects the storage location 111a in the piecewise storage register 111 for storing the generated first piecewise accumulated IF value a(0) on receiving a counter signal generated by the counter 110b.

Upon receiving the third restart control signal from the accumulation control logic unit 108, the accumulator 110a generates a first piecewise accumulated intermediate frequency (IF) value a(1) at the time instant that the accumulator 110a receives the third restart control signal from the accumulation control logic unit 108, stores the generated first piecewise accumulated IF value a(1) in a storage location 111*b* of the piecewise storage register 111, and starts receiving and accumulating the samples of the IF data until a fourth restart control signal is received from the accumulation control logic unit 108. The piecewise selector 110*c* selects the storage location 111*b* in the piecewise storage register 111 for storing the generated first piecewise accumulated IF value a(1) on receiving a counter signal generated by the counter 110*b*. Upon receiving the fourth restart control signal from the accumulation control logic unit 108, the accumulator 110*a* generates a first piecewise accumulated IF value a(2) at the time instant that the accumulator 110*a* receives the fourth restart control signal from the accumulation control logic unit 108, stores the generated first piecewise accumulated IF value a(2) in a storage location 111*c* of the piecewise storage register 111, and starts receiving and accumulating the samples of the IF data until a fifth restart control signal is received. The piecewise selector 110*c* selects the storage location 111*c* in the piecewise storage register 111 for storing the generated first piecewise accumulated IF value a(2) on receiving a counter signal generated by the counter 110*b*.

The accumulation control logic block 108*b* receives the code bit clock(0)—early, the code bit clock(1)—prompt, and the code bit clock(2)—late and generates an add control signal on detecting the rising edge of each of the code bit clocks, that is, the code bit clock(0)—early, the code bit clock(1)—prompt, and the code bit clock(2)—late. The code bit accumulator 112 receives and accumulates the stored first piecewise accumulated intermediate frequency (IF) value a(0), the stored first piecewise accumulated IF value a(1), and the stored first piecewise accumulated IF value a(2) from the storage locations 111*a*, 111*b*, and 111*c* respectively, on receiving the add control signal at the rate fs and generates a first code bit accumulated value at the reduced rate fc*k, where fc is the chipping rate.

The pseudo random noise (PRN) code generator 113*a* generates the PRN code bit sequence of the global navigation satellite system (GNSS) signal that corresponds to a satellite tracked by the tracking channel 105*a*. The PRN code register 113*b* receives the PRN code generated by the PRN code generator 113*a*. The PRN code register 113*b* stores the arms of the generated PRN code bit sequence by introducing a calculated delay while storing the PRN code bit sequence in different locations of the PRN code register 113*b*. An early arm of the PRN code bit sequence, a prompt arm of the PRN code bit sequence, and a late arm of the PRN code bit sequence are stored in the PRN code register 113*b*. The accumulation control logic unit 108 generates the arm selection control signal based on the occurrence of the rising edge of the code bit clock(0)—early, the code bit clock(1)—prompt, and the code bit clock(2)—late. For example, on the second rising edge of the code bit clock(0)—early, the accumulation control logic unit 108 generates an arm selection control signal to trigger the first selector 114 to select an early arm of the PRN code. The time multiplexed primary mixer 115 receives the selected early arm of the generated PRN code bit sequence from the first selector 114 and the first code bit accumulated value from the code bit accumulator 112. The time multiplexed primary mixer 115 mixes the received first code bit accumulated value with the received early arm of the generated PRN code bit sequence to generate a first despread value corresponding to the early arm of the generated PRN code bit sequence.

The tracking engine control unit 123 controls the carrier numerically controlled oscillator (NCO) 119 exemplarily illustrated in FIGS. 1-2, through a control signal, to generate a carrier reference signal at a reduced rate fs/M, where M=3. Therefore, the carrier generator 118 generates a carrier signal at a rate of 21.824 MHz, when fs is 65.472 MHz. In an embodiment, the carrier generator 118 generates a carrier signal at a rate of as low as, for example, 1 MHz. The carrier generator 118 uses the carrier reference signal to generate an inphase carrier signal and a quadrature phase carrier signal. The secondary mixer 117*a* receives and mixes the generated first despread value corresponding to the early arm of the generated PRN code bit sequence with the inphase carrier signal to generate an inphase component of the generated first despread value. The secondary mixer 117*b* receives and mixes the generated first despread value corresponding to the early arm of the generated PRN code bit sequence with the quadrature phase carrier signal to generate a quadrature phase component of the generated first despread value. The integrator and dump unit 120*a* generates an inphase correlation component of the generated first despread value by coherently integrating and dumping the generated inphase component of the generated first despread value with a previously generated inphase component of a previously generated despread value corresponding to the early arm. The integrator and dump unit 120*b* generates a quadrature phase correlation component by coherently integrating and dumping the generated quadrature phase component of the generated first despread value with a previously generated quadrature phase component of a previously generated despread value corresponding to the early arm. The storage array 122 stores the generated inphase correlation component and the generated quadrature phase correlation component of the generated first despread value corresponding to the selected early arm of the PRN code bit sequence in the storage location 122*a* selected by the second selector 121 on receiving an arm selection control signal from the accumulation control logic unit 108.

The accumulator 110*a* receives and accumulates the samples of the intermediate frequency (IF) data from the fourth restart control signal until a fifth restart control signal is received from the accumulation control logic unit 108. Upon receiving the fifth restart control signal from the accumulation control logic unit 108, the accumulator 110*a* generates a second piecewise accumulated IF value a(0) at the time instant that the accumulator 110*a* receives the fifth restart control signal from the accumulation control logic unit 108, stores the generated second piecewise accumulated IF value a(0) in a storage location 111*a* of the piecewise storage register 111 by overwriting the stored first piecewise accumulated IF value a(0), and starts receiving and accumulating the samples of the IF data until a sixth restart control signal is received from the accumulation control logic unit 108. The piecewise selector 110*c* selects the storage location 111*a* in the piecewise storage register 111 for storing the generated second piecewise accumulated IF value a(0) on receiving a counter signal generated by the counter 110*b*. The code bit accumulator 112 receives and accumulates the stored second piecewise accumulated IF value a(0), the stored first piecewise accumulated IF value a(1), and the stored first piecewise accumulated IF value a(2) from the storage locations 111*a*, 111*b*, and 111*c* respectively, at the rate fs on receiving the add control signal, and generates a second code bit accumulated value at the reduced rate fc*k.

At the second rising edge of the code bit clock(1)—prompt, the accumulation control logic unit 108 generates an arm selection control signal to trigger the first selector 114 to select the prompt arm of the pseudo random noise (PRN) code bit sequence. The time multiplexed primary mixer 115 receives the selected prompt arm of the generated PRN code bit sequence from the first selector 114 and the second code bit accumulated value from the code bit accumulator 112. The time multiplexed primary mixer 115 mixes the received second code bit accumulated value with the received prompt arm of the generated PRN code bit sequence to generate a second despread value corresponding to the prompt arm of the generated PRN code bit sequence. The tracking engine control unit 123 controls the carrier numerically controlled oscillator (NCO) 119 through the control signal to generate a carrier reference signal of a reduced rate fs/M. The carrier generator 118 uses the carrier reference signal to generate an inphase carrier signal and a quadrature phase carrier signal.

The secondary mixer 117a receives and mixes the generated second despread value corresponding to the prompt arm of the generated pseudo random noise (PRN) code bit sequence with the inphase carrier signal to generate an inphase component of the generated second despread value. The secondary mixer 117b receives and mixes the generated second despread value corresponding to the prompt arm of the generated PRN code bit sequence with the quadrature phase carrier signal to generate a quadrature phase component of the generated second despread value. The integrator and dump unit 120a generates an inphase correlation component by coherently integrating and dumping the generated inphase component of the generated second despread value with a previously generated inphase component of a previously generated despread value corresponding to the prompt arm. The integrator and dump unit 120b generates a quadrature phase correlation component by coherently integrating and dumping the generated quadrature phase component of the generated second despread value with a previously generated quadrature phase component of a previously generated despread value corresponding to the prompt arm. The storage array 122 stores the generated inphase correlation component and the generated quadrature phase correlation component of the generated second despread value corresponding to the selected prompt arm of the PRN code bit sequence in the storage location 122b selected by the second selector 121 on receiving an arm selection control signal from the accumulation control logic unit 108.

The accumulator 110a receives and accumulates the samples of the intermediate frequency (IF) data from the fifth restart control signal until a sixth restart control signal is received from the accumulation control logic unit 108. Upon receiving the sixth restart control signal from the accumulation control logic unit 108, the accumulator 110a generates a second piecewise accumulated IF value a(1) at the time instant that the accumulator 110a receives the sixth restart control signal from the accumulation control logic unit 108, stores the generated second piecewise accumulated IF value a(1) in the storage location 111b of the piecewise storage register 111 by overwriting the stored first piecewise accumulated IF value a(1), and starts receiving and accumulating the samples of the IF data until a seventh restart control signal is received from the accumulation control logic unit 108. The piecewise selector 110c selects the storage location 111b in the piecewise storage register 111 for storing the generated second piecewise accumulated IF value a(1) based on a counter signal generated by the counter 110b. The code bit accumulator 112 receives and accumulates the stored second piecewise accumulated IF value a(0), the stored second piecewise accumulated IF value a(1), and the stored first piecewise accumulated IF value a(2) from the storage locations 111a, 111b, and 111c respectively, at the rate fs, on receiving the add control signal, and generates a third code bit accumulated value at the reduced rate fc*k.

At the second rising edge of the code bit clock(2)—late, the accumulation control logic unit 108 generates an arm selection control signal to trigger the first selector 114 to select the late arm of the pseudo random noise (PRN) code bit sequence. The time multiplexed primary mixer 115 receives the selected late arm of the generated PRN code bit sequence from the first selector 114 and the third code bit accumulated value from the code bit accumulator 112. The time multiplexed primary mixer 115 mixes the received third code bit accumulated value with the received late arm of the generated PRN code bit sequence to generate a third despread value corresponding to the late arm of the generated PRN code bit sequence. The tracking engine control unit 123 controls the carrier numerically controlled oscillator (NCO) 119 through a control signal to generate a carrier reference signal of a reduced rate fs/M. The carrier generator 118 uses the carrier reference signal to generate an inphase carrier signal and a quadrature phase carrier signal. The secondary mixer 117a receives and mixes the generated third despread value corresponding to the late arm of the generated PRN code bit sequence with the inphase carrier signal to generate an inphase component of the generated third despread value. The secondary mixer 117b receives and mixes the generated third despread value corresponding to the late arm of the generated PRN code bit sequence with the quadrature phase carrier signal to generate a quadrature phase component of the generated third despread value. The integrator and dump unit 120a generates an inphase correlation component by coherently integrating and dumping the generated inphase component of the generated third despread value with a previously generated inphase component of a previously generated despread value corresponding to the late arm. The integrator and dump unit 120b generates a quadrature phase correlation component by coherently integrating and dumping the generated quadrature phase component of the generated third despread value with a previously generated quadrature phase component of a previously generated despread value corresponding to the late arm. The storage array 122 stores the generated inphase correlation component and the generated quadrature phase correlation component of the generated third despread value corresponding to the selected late arm of the PRN code bit sequence in the storage location 122c selected by the second selector 121 on receiving an arm selection control signal from the accumulation control logic unit 108.

The accumulator 110a receives and accumulates the samples of the intermediate frequency (IF) data from the sixth restart control signal until a seventh restart control signal is received from the accumulation control logic unit 108. Upon receiving the seventh restart control signal from the accumulation control logic unit 108, the accumulator 110a generates a second piecewise accumulated IF value a(2) at the time instant that the accumulator 110a receives the seventh restart control signal, stores the generated second piecewise accumulated IF value a(2) in the storage location 111c of the piecewise storage register 111 by overwriting the stored first piecewise accumulated IF value a(2), and starts receiving and accumulating the samples of the IF data until an eighth restart control signal is received. The piecewise selector 110c selects the storage location 111c in the piecewise storage register 111 for storing the generated second piecewise accumulated IF value a(2) based on a counter signal generated by the counter 110b. The code bit accumulator 112 receives and accumulates the stored second piecewise accumulated IF value a(0), the stored second piecewise accumulated IF value a(1), and the stored second piecewise accumulated IF value a(2) from the storage locations 111a, 111b, and 111c respectively, at the rate fs, on receiving the add control signal, and generates a fourth code bit accumulated value at the reduced rate fc*k.

At the third rising edge of the code bit clock(0)—early, the accumulation control logic unit 108 generates an arm selection control signal to trigger the first selector 114 to select the early arm of the pseudo random noise (PRN) code bit sequence. The time multiplexed primary mixer 115 receives the selected early arm of the generated PRN code bit sequence from the first selector 114 and the fourth code bit accumulated value from the code bit accumulator 112. The time multiplexed primary mixer 115 mixes the received fourth code bit accumulated value with the received early arm of the generated PRN code bit sequence to generate a fourth despread value corresponding to the early arm of the generated PRN code bit sequence. The tracking engine control unit 123 controls the carrier numerically controlled oscillator (NCO) 119 through a control signal to generate a carrier reference signal of a reduced rate fs/M. The carrier generator 118 uses the carrier reference signal to generate an inphase carrier signal and a quadrature phase carrier signal. The secondary mixer 117a receives and mixes the generated fourth despread value corresponding to the early arm of the generated PRN code bit sequence with the inphase carrier signal to generate an inphase component of the generated fourth despread value. The secondary mixer 117b receives and mixes the generated fourth despread value corresponding to the early arm of the generated PRN code bit sequence with the quadrature phase carrier signal to generate a quadrature phase component of the generated fourth despread value. The integrator and dump unit 120a generates an inphase correlation component of the generated fourth despread value by coherently integrating and dumping the generated inphase component of the generated fourth despread value with a previously generated inphase component of a previously generated despread value corresponding to the early arm. The integrator and dump unit 120b generates the quadrature phase correlation component of the generated fourth despread value by coherently integrating and dumping the generated quadrature phase component of the generated fourth despread value with a previously generated quadrature phase component of a previously generated despread value corresponding to the early arm. The storage array 122 stores the generated inphase correlation component and the generated quadrature phase correlation component of the generated fourth despread value corresponding to the selected early arm of the PRN code bit sequence in the storage location 122a selected by the second selector 121 on receiving an arm selection control signal from the accumulation control logic unit 108.

The accumulator 110a continues to receive and accumulate the samples of the intermediate frequency (IF) data to generate piecewise accumulated IF values and stores the generated piecewise accumulated IF values in the piecewise storage register 111 in a circular buffer manner as disclosed above. The code bit accumulator 112 continues to generate code bit accumulated values, that is, one code bit accumulated value at one time instant, by accumulating the piecewise accumulated IF values stored in the piecewise storage register 111 and provides each of the generated the code bit accumulated values to the time multiplexed primary mixer 115 as disclosed above. The first selector 114 continues to select an arm of the pseudo random noise (PRN) code bit sequence, that is, one arm for one code bit accumulated value generated at one time instant, and provides the selected arm of the PRN code bit sequence to the time multiplexed primary mixer 115 as disclosed above. The time multiplexed primary mixer 115 mixes the code bit accumulated value with the selected arm of the PRN code bit sequence to generate a despread value as disclosed above. The secondary mixers 117a and 117b generate an inphase component and a quadrature phase component of the generated despread value respectively, as disclosed above. The integrator and dump units 120a and 120b generate an inphase correlation component and a quadrature phase correlation component respectively, for each despread value at each time instant and store the generated inphase correlation component and the quadrature phase correlation component in the storage array 122 as disclosed above.

FIGS. 10A-10B exemplarily illustrate a comparison table showing resource comparison and reduction of power consumption between a standard correlator (not shown) and the global navigation satellite system signal tracking system (GNSSSTS) 106 exemplarily illustrated in FIGS. 1-4. Consider the standard correlator and the GNSSSTS 106 with arms of a pseudo random noise (PRN) code bit sequence equal to 3. The comparison table exemplarily illustrated in FIGS. 10A-10B, shows the components count for functional blocks comprising real or imaginary components, small adders or subtractors in secondary mixers, and the carrier generator comprising a 32-bit numerically controlled oscillator (NCO) and a phase-to-amplitude converter, in the standard correlator and the GNSSSTS 106 is equal. The real or imaginary components refer to inphase components and quadrature phase components. The small adders or subtractors refer to two input adders or subtractors that are a part of the secondary mixers. The components count of the PRN code generator, that is, a 32-bit NCO, and the PRN code generator, that is, a linear feedback shift register (LFSR) based code generator with two polynomials, in the standard correlator and the GNSSSTS 106 is equal. Moreover, the components count of the primary mixer and the integrator and dump units in the standard correlator is greater than the components count of the time multiplexed primary mixer 115 and the integrator and dump units 120a and 120b in the GNSSSTS 106 exemplarily illustrated in FIGS. 1-3. Furthermore, the components count of the storage array in the standard correlator and the storage array 122 in the GNSSSTS 106 exemplarily illustrated in FIGS. 1-4, is equal.

The rate of operation of most of the components of the standard correlator, for example, the primary mixer, the real or imaginary components, the small adders or subtractors in the secondary mixers, the carrier generator, the pseudo random noise (PRN) code generator, that is, the 32-bit numerically controlled oscillator (NCO), the integrator and dump units, and the storage array is fs, while the rate of operation of most of the components of the global navigation satellite system signal tracking system (GNSSSTS) 106 is a reduced rate of fc*k or fs/M. For example, the rate of operation of the carrier generator 118 of the GNSSSTS 106 exemplarily illustrated in FIGS. 1-3, is fs/M, where "M" is a rate reduction factor that reduces the rate of the carrier reference signal, for example, to about 1 MHz or to about as low as twice the Doppler frequency required to be generated by each of the tracking channels 105a, 105b, and 105c of the tracking channel array 105 exemplarily illustrated in FIGS. 1-2. The rate of operation of the time multiplexed primary mixer 115, the real or imaginary components, the small adders or subtractors in the secondary mixers 117a and 117b, the integrator and dump units 120a and 120b, and the storage array 122 in the GNSSSTS 106 exemplarily illustrated in FIGS. 1-3, is fc*k, where "k" is the number of arms of the PRN code bit sequence. The power saving ratio for the functional blocks such as the carrier generator 118 between the standard correlator and the GNSSSTS 106 is M, while the power saving ratio for the functional blocks such as the time multiplexed primary mixer 115, the real or imaginary components, the small adders or subtractors in the secondary mixers 117a and 117b, the integrator and dump units 120a and 120b, and the storage array 122 between the standard correlator and the GNSSSTS 106 is fs/(fc*k).

The rate of operation of the pseudo random noise (PRN) code generator comprising the 32-bit numerically controlled oscillator (NCO) in the standard correlator and the PRN code generator 113a exemplarily illustrated in FIGS. 3-4, in the global navigation satellite system signal tracking system (GNSSSTS) 106 is equal to fs, and the rate of operation of the linear feedback shift register (LFSR) based code generator with two polynomials in the standard correlator and the GNSSSTS 106 is the chipping rate, and hence the power saving ratio for the PRN code generator 113a is 1. The components count for a functional block such as the resettable piecewise accumulator 110 in the GNSSSTS 106 exemplarily illustrated in FIGS. 1-4, is 3 whereas the standard correlator does not include the resettable piecewise accumulator 110. The components count for a functional block such as the code bit accumulator 112 in the GNSSSTS 106 exemplarily illustrated in FIGS. 1-4, is 1, whereas the standard correlator does not include the code bit accumulator 112. The components count for a functional block such as the primary mixer in the standard correlator is 3 and for the time multiplexed primary mixer 115 in the GNSSSTS 106 is 2. Since the rate of operation of the primary mixer in the standard correlator and the time multiplexed primary mixer 115 in the GNSSSTS 106 is fs and fc*k respectively, the power saving ratio is fs/(fc*k). The components count for functional blocks such as the integrator and dump units that perform inphase (I) and quadrature (Q) coherent integration in the standard correlator is 6 and for the integrator and dump units 120a and 120b in the GNSSSTS 106 is 2. Since the rate of operation of the integrator and dump units in the standard correlator and the integrator and dump units 120a and 120b in the GNSSSTS 106 is fs and fc*k respectively, the power saving ratio is fs/(fc*k). The components count for a functional block such as the storage array in the standard correlator is 6 and for the storage array 122 in the GNSSSTS 106 is 6. The rate of operation of the storage array in the standard correlator is fs and the rate of operation of the storage array 122 in the GNSSSTS 106 is fc*k. Hence, the power saving ratio for the storage array 122 is fs/(fc*k). Therefore, there is a significant reduction in power in the GNSSSTS 106 compared to the standard correlator.

Consider an example where the frequency of the intermediate frequency (IF) data, fs, is 65.472 MHz, where fs is the sampling frequency, number of arms of the pseudo random noise (PRN) code bit sequence, k, is 3, and the chipping rate fc is 1.023 MHz. The time multiplexed primary mixer 115, the secondary mixers 117a and 117b, the integrator and dump units 120a and 120b, and the storage array 122 of the global navigation satellite system signal tracking system (GNSSSTS) 106 operate at the rate fc*k, that is, 1.023 MHz*3, which is equal to 3.069 MHz, while the carrier generator 118 operates at a rate fs/M such that fs/M is equal to 1 Mhz or twice the Doppler frequency. In this example, fs/M is equal to 1 MHz. The carrier generator 118 of the GNSSSTS 106 operates at a reduced rate that is about 65.472 times less than the rate of operation of the carrier generator of the standard correlator, while the time multiplexed primary mixer 115, the secondary mixers 117a and 117b, the integrator and dump units 120a and 120b, and the storage array 122 of the GNSSSTS 106 operate at a reduced rate that is about 21 times less than the rate of operation of the corresponding components of the standard correlator. Similarly, if the frequency of the IF data, fs, is 45.15 MHz, the number of arms of the PRN code bit sequence, k, is 3, the chipping rate fc is 1.023 MHz, and fs/M is equal to 1 MHz, the carrier generator 118 of the GNSSSTS 106 operates at a reduced rate that is about 45.15 times less than the rate of operation of the carrier generator of the standard correlator, while the time multiplexed primary mixer 115, the secondary mixers 117a and 117b, the integrator and dump units 120a and 120b, and the storage array 122 of the GNSSSTS 106 operate at a reduced rate that is about 14.7 times less than the rate of operation of the corresponding components of the standard correlator. As the frequency of the intermediate frequency data, fs, that is, the sampling frequency, increases, the power saving and resources increase.

The global navigation satellite system signal tracking system (GNSSSTS) 106 has a minimal rate of operation compared to the standard correlator as the components of the GNSSSTS 106 operate at a lower rate compared to the standard correlator. The increase in resources is considered insignificant with respect to the increased power saving. The overall component count in the standard correlator is 23 and the overall component count in the GNSSSTS 106 is 22. Therefore, the number of components required by the GNSSSTS 106 is less than the number of components required by the standard correlator to track a global navigation satellite system (GNSS) signal. The minimal rate of operation of the components of the GNSSSTS 106 aids in an overall reduction of power consumption by the GNSSSTS 106.

The foregoing examples have been provided merely for explanation and are in no way to be construed as limiting of the method and the low power minimal rate global navigation satellite system signal tracking system (GNSSSTS) 106 disclosed herein. While the method and the GNSSSTS 106 have been described with reference to various embodiments, it is understood that the words, which have been used herein, are words of description and illustration, rather than words of limitation. Furthermore, although the method and the GNSSSTS 106 have been described herein with reference to particular means, materials, and embodiments, the method and the GNSSSTS 106 are not intended to be limited to the particulars disclosed herein; rather, the method and the GNSSSTS 106 extend to all functionally equivalent structures, methods and uses, such as are within the scope of the appended claims. While multiple embodiments are disclosed, it will be understood by those skilled in the art, having the benefit of the teachings of this specification, that the method and the GNSSSTS 106 disclosed herein are capable of modifications, and other embodiments may be effected and changes may be made thereto, without departing from the scope and spirit of the method and the GNSSSTS 106 disclosed herein.

We claim:

1. A global navigation satellite system signal tracking system deployed in a tracking channel of a global navigation satellite system baseband engine for tracking a global navigation satellite system signal, said global navigation satellite system signal tracking system comprising:
   an accumulation control logic unit for generating control signals;
   a piecewise down sampling module operably connected to said accumulation control logic unit for generating code bit accumulated values at different time instants at a reduced rate from a stream of samples of intermediate frequency data received at a rate higher than said reduced rate of said code bit accumulated values, on receiving at least two of said control signals from said accumulation control logic unit;

a pseudo random noise code generation module operably connected to said piecewise down sampling module via a time multiplexed primary mixer for generating a pseudo random noise code bit sequence corresponding to said global navigation satellite system signal and storing arms of said generated pseudo random noise code bit sequence;

a first selector operably connected to said pseudo random noise code generation module for selecting one of said stored arms of said generated pseudo random noise code bit sequence for one of said code bit accumulated values generated at one of said time instants, on receiving another of said control signals from said accumulation control logic unit;

said time multiplexed primary mixer operably connected to said first selector and said piecewise down sampling module for generating a despread value by mixing said one of said code bit accumulated values with said selected one of said stored arms of said generated pseudo random noise code bit sequence;

a time multiplexed phase component generation module operably connected to said time multiplexed primary mixer for generating an inphase correlation component and a quadrature phase correlation component of said generated despread value; and a storage array operably connected to said time multiplexed phase component generation module via a second selector for storing said generated inphase correlation component and said generated quadrature phase correlation component of said generated despread value in a storage location of said storage array selected by said second selector based on said selected one of said arms of said generated pseudo random noise code bit sequence;

wherein said first selector, said time multiplexed primary mixer, said time multiplexed phase component generation module, and said storage array perform their respective functions continuously for each of said code bit accumulated values generated at corresponding said time instants.

2. The global navigation satellite system signal tracking system of claim 1, further comprising a clock generator operably connected to said accumulation control logic unit and said pseudo random noise code generation module for generating clock signals for activating said accumulation control logic unit and said pseudo random noise code generation module.

3. The global navigation satellite system signal tracking system of claim 1, wherein said piecewise down sampling module comprises:

a resettable piecewise accumulator operably connected to said accumulation control logic unit for continuously generating piecewise accumulated intermediate frequency values from said received samples of said intermediate frequency data by accumulating said received samples of said intermediate frequency data, on receiving one of said at least two of said control signals from said accumulation control logic unit;

a piecewise storage register operably connected to said resettable piecewise accumulator for storing said piecewise accumulated intermediate frequency values in storage locations of said piecewise storage register corresponding to said different time instants; and a code bit accumulator operably connected to said piecewise storage register and said accumulation control logic unit for generating said code bit accumulated values at said reduced rate by sequentially accumulating a predefined combination of said stored piecewise accumulated intermediate frequency values over a code bit period on receiving another one of said at least two of said control signals from said accumulation control logic unit.

4. The global navigation satellite system signal tracking system of claim 1, wherein said pseudo random noise code generation module comprises:

a pseudo random noise code generator for generating said pseudo random noise code bit sequence corresponding to said global navigation satellite system signal; and a pseudo random noise code register for storing said arms of said generated pseudo random noise code bit sequence.

5. The global navigation satellite system signal tracking system of claim 1, wherein said time multiplexed phase component generation module comprises:

a carrier numerically controlled oscillator for generating a carrier reference signal at a reduced rate;

a carrier generator operably connected to said carrier numerically controlled oscillator for generating a carrier signal using said generated carrier reference signal;

secondary mixers operably connected to said carrier generator and said time multiplexed primary mixer for generating an inphase component and a quadrature phase component of said generated despread value by mixing said generated despread value with said generated carrier signal; and integrator and dump units operably connected to corresponding said secondary mixers for generating said inphase correlation component and said quadrature phase correlation component of said generated despread value by coherently integrating and dumping said generated inphase component and said generated quadrature phase component of said generated despread value with a previously generated inphase component and a previously generated quadrature phase component of a previously generated despread value respectively, corresponding to said selected one of said stored arms of said generated pseudo random noise code bit sequence.

6. The global navigation satellite system signal tracking system of claim 5 operably connected to a tracking engine control unit, wherein said tracking engine control unit generates a control signal for controlling and selecting said reduced rate of said carrier reference signal generated by said carrier numerically controlled oscillator of said time multiplexed phase component generation module.

7. The global navigation satellite system signal tracking system of claim 1, wherein carrier frequency of said intermediate frequency data is offset to one of zero and near zero by a carrier frequency offset module operably connected to said piecewise down sampling module in said global navigation satellite system baseband engine.

8. A method for tracking a global navigation satellite system signal, said method comprising:

deploying a global navigation satellite system signal tracking system in a tracking channel of a global navigation satellite system baseband engine, said global navigation satellite system signal tracking system comprising an accumulation control logic unit, a piecewise down sampling module, a pseudo random noise code generation module, a first selector, a time multiplexed primary mixer, a time multiplexed phase component generation module, a second selector, and a storage array;

generating control signals by said accumulation control logic unit;

generating code bit accumulated values at different time instants at a reduced rate from a stream of samples of intermediate frequency data received at a rate higher than said reduced rate of said code bit accumulated values by said piecewise down sampling module, on receiving at least two of said control signals from said accumulation control logic unit;

generating a pseudo random noise code bit sequence corresponding to said global navigation satellite system signal and storing arms of said generated pseudo random noise code bit sequence by said pseudo random noise code generation module;

for each of said code bit accumulated values generated at corresponding said time instants:

selecting one of said stored arms of said generated pseudo random noise code bit sequence for one of said code bit accumulated values generated at one of said time instants by said first selector, on receiving another of said control signals from said accumulation control logic unit;

generating a despread value by mixing said one of said code bit accumulated values with said selected one of said stored arms of said generated pseudo random noise code bit sequence by said time multiplexed primary mixer;

generating an inphase correlation component and a quadrature phase correlation component of said generated despread value by said time multiplexed phase component generation module; and storing said generated inphase correlation component and said generated quadrature phase correlation component of said generated despread value in a storage location of said storage array selected by said second selector based on said selected one of said arms of said generated pseudo random noise code bit sequence.

9. The method of claim 8, further comprising generating clock signals for activating said accumulation control logic unit and said pseudo random noise code generation module, by a clock generator of said global navigation satellite system signal tracking system.

10. The method of claim 8, wherein said piecewise down sampling module comprises a resettable piecewise accumulator, a piecewise storage register, and a code bit accumulator, and wherein said generation of said code bit accumulated values at said different time instants at said reduced rate comprises:

continuously generating piecewise accumulated intermediate frequency values from said received samples of said intermediate frequency data by said resettable piecewise accumulator by accumulating said received samples of said intermediate frequency data, on receiving one of said at least two of said control signals from said accumulation control logic unit;

storing said piecewise accumulated intermediate frequency values in storage locations of said piecewise storage register corresponding to said different time instants; and generating said code bit accumulated values at said reduced rate by said code bit accumulator by sequentially accumulating a predefined combination of said stored piecewise accumulated intermediate frequency values over a code bit period on receiving another one of said at least two of said control signals from said accumulation control logic unit.

11. The method of claim 8, wherein said time multiplexed phase component generation module comprises a carrier numerically controlled oscillator, a carrier generator, secondary mixers, and integrator and dump units, and wherein said generation of said inphase correlation component and said quadrature phase correlation component of said generated despread value comprises:

generating a carrier reference signal at a reduced rate by said carrier numerically controlled oscillator;

generating a carrier signal by said carrier generator using said generated carrier reference signal;

generating an inphase component and a quadrature phase component of said generated despread value by said secondary mixers by mixing said generated despread value with said generated carrier signal; and generating said inphase correlation component and said quadrature phase correlation component of said generated despread value by corresponding said integrator and dump units by coherently integrating and dumping said generated inphase component and said generated quadrature phase component of said generated despread value with a previously generated inphase component and a previously generated quadrature phase component of a previously generated despread value respectively, corresponding to said selected one of said stored arms of said generated pseudo random noise code bit sequence.

12. The method of claim 11, further comprising generating a control signal for controlling and selecting said reduced rate of said carrier reference signal by a tracking engine control unit operably connected to said global navigation satellite system signal tracking system.

13. The method of claim 8, further comprising offsetting carrier frequency of said intermediate frequency data to one of zero and near zero by a carrier frequency offset module in said global navigation satellite system baseband engine.

* * * * *